(12) United States Patent
Cho et al.

(10) Patent No.: US 9,794,506 B2
(45) Date of Patent: Oct. 17, 2017

(54) INPUT APPARATUS, DISPLAY APPARATUS AND CONTROL METHOD THEREOF

(71) Applicant: SAMSUNG ELECTRONICS CO., LTD., Suwon-si, Gyeonggi-do (KR)

(72) Inventors: Eun Nim Cho, Suwon-si (KR); Woo Youl Lim, Yongin-si (KR); Sung Gook Jang, Gunpo-si (KR); Young Ki Cha, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/060,798

(22) Filed: Mar. 4, 2016

(65) Prior Publication Data
US 2016/0277699 A1 Sep. 22, 2016

(30) Foreign Application Priority Data

Mar. 20, 2015 (KR) .................. 10-2015-0039192

(51) Int. Cl.
*H04N 5/44* (2011.01)
*H04N 21/422* (2011.01)
(Continued)

(52) U.S. Cl.
CPC ......... *H04N 5/4403* (2013.01); *G06F 3/0346* (2013.01); *G06F 3/0383* (2013.01);
(Continued)

(58) Field of Classification Search
CPC .................................................. H04N 5/4403
(Continued)

(56) References Cited

U.S. PATENT DOCUMENTS

| 5,999,799 A | 12/1999 | Hu et al. |
| 2005/0091684 A1* | 4/2005 | Kawabata ............... G10L 15/26 725/35 |

(Continued)

FOREIGN PATENT DOCUMENTS

| GB | 2 219 678 | 12/1989 |
| JP | 2000-218578 | 8/2000 |

(Continued)

OTHER PUBLICATIONS

Extended Search Report mailed Jul. 17, 2016 in counterpart European Application No. 16161252.8.
(Continued)

*Primary Examiner* — Paulos M Nathnael
*Assistant Examiner* — Justin Sanders
(74) *Attorney, Agent, or Firm* — Nixon & Vanderhye P.C.

(57) ABSTRACT

An input apparatus, a display apparatus, and control methods thereof are disclosed. The input apparatus for the display apparatus includes a user input device configured to receive a user's input; communication circuitry configured to communicate with the display apparatus; a driver configured to provide a driving force to drive the input apparatus to move; and at least one processor configured to control the driver to move the input apparatus to a preset location corresponding to a user's location in response to a preset event so that a user can take and use the input apparatus. Thus, a movable input apparatus comes to a user by itself and provides user-friendly interaction, thereby improving a user's convenience.

17 Claims, 46 Drawing Sheets

(51) Int. Cl.
*G06F 3/0346* (2013.01)
*G06F 3/038* (2013.01)

(52) U.S. Cl.
CPC ............... *H04N 21/42222* (2013.01); *H04N 2005/4407* (2013.01); *H04N 2005/4428* (2013.01); *H04N 2005/4432* (2013.01)

(58) Field of Classification Search
USPC ........................................................ 348/734
See application file for complete search history.

(56) References Cited

U.S. PATENT DOCUMENTS

| 2008/0318679 | A1 | 12/2008 | Tran et al. | |
|---|---|---|---|---|
| 2009/0157228 | A1* | 6/2009 | Hong | B25J 9/1689 |
| | | | | 700/259 |
| 2013/0332952 | A1 | 12/2013 | Anandpura et al. | |
| 2013/0335349 | A1* | 12/2013 | Ferren | G06K 9/3266 |
| | | | | 345/173 |
| 2014/0206480 | A1 | 7/2014 | Davis et al. | |

FOREIGN PATENT DOCUMENTS

| JP | 3076931 | 2/2001 |
|---|---|---|
| JP | 2006-018727 | 1/2006 |
| JP | 2006-222504 | 8/2006 |
| JP | 2012-094011 | 5/2012 |

OTHER PUBLICATIONS

Office Action for EP Application No. 16 161 252.8 dated Aug. 2, 2017.
Wikipedia: "Universal Remote", Wikipedia, Oct. 30, 2014; pp. 1-4; Retrieved from Internet.

* cited by examiner

FIG. 23
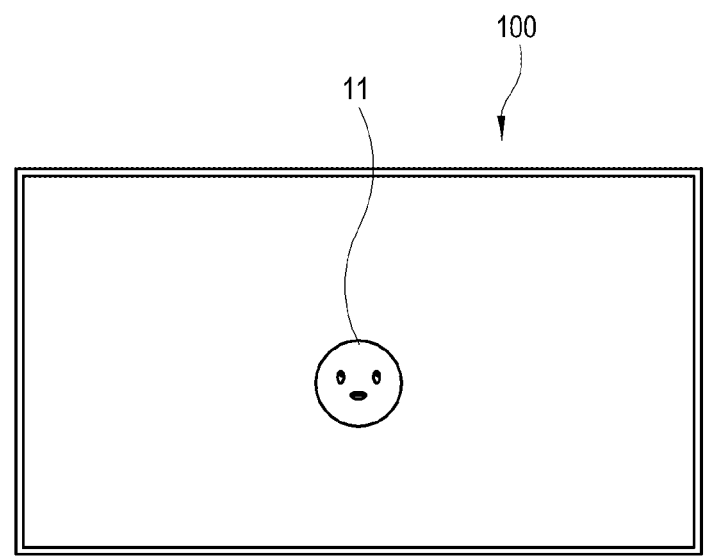
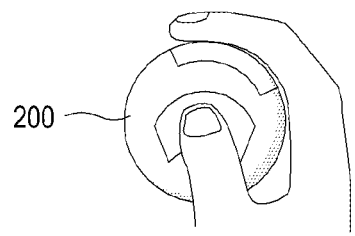

FIG. 24
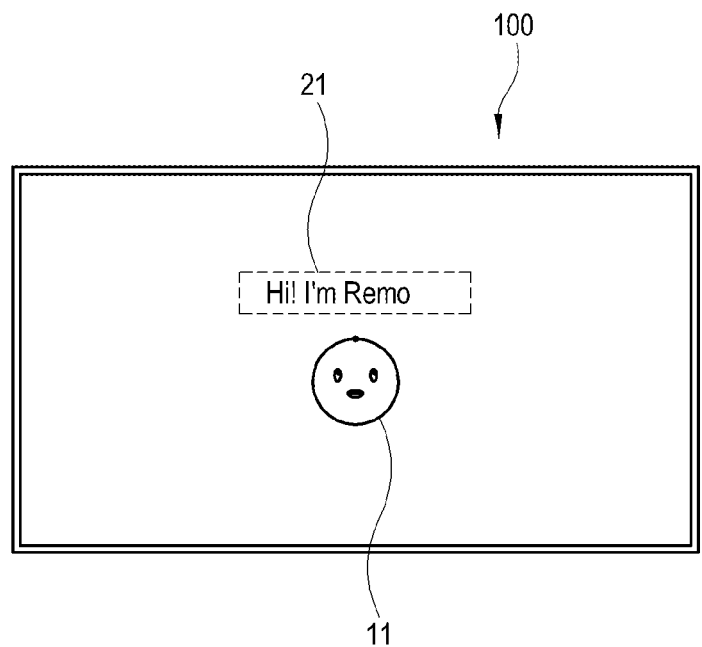
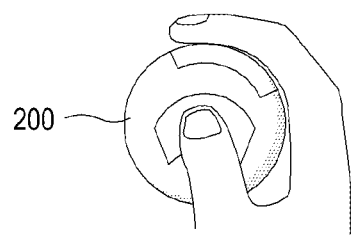

FIG. 28
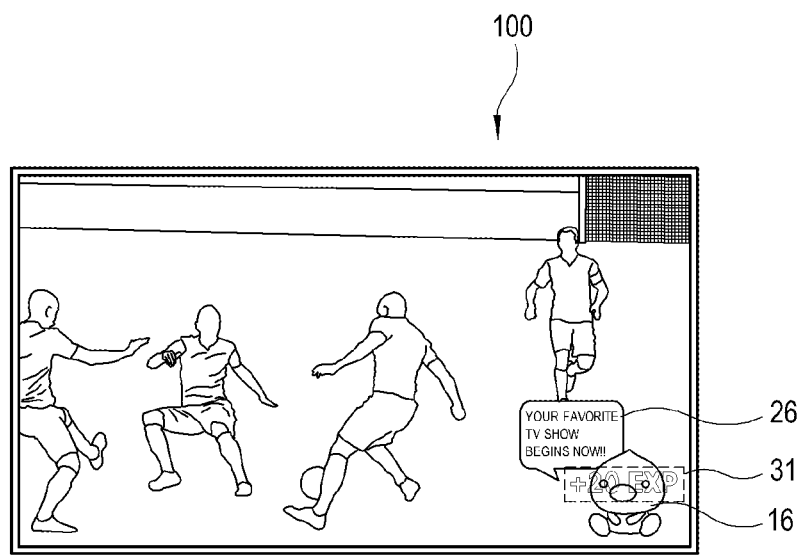
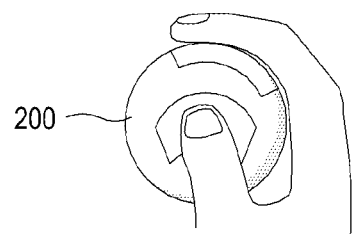

FIG. 29
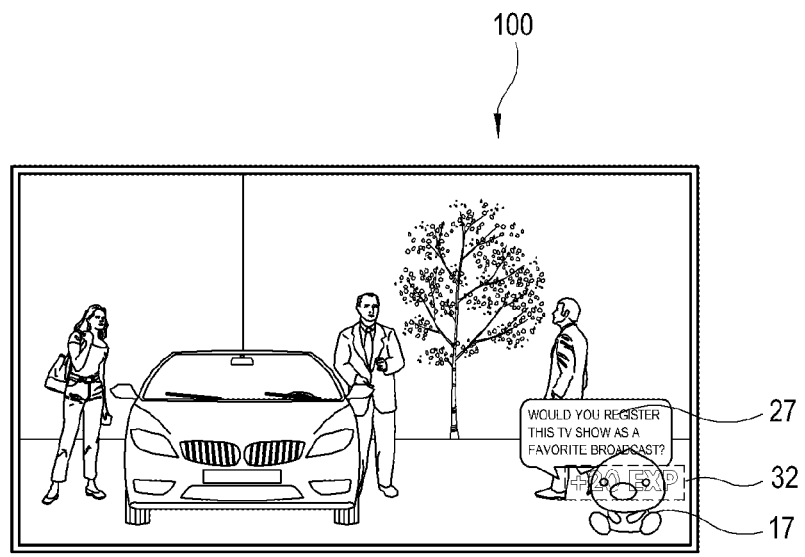
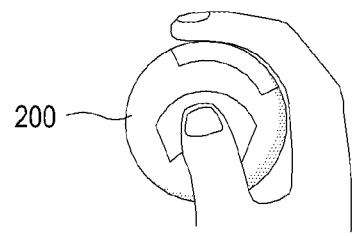

FIG. 30
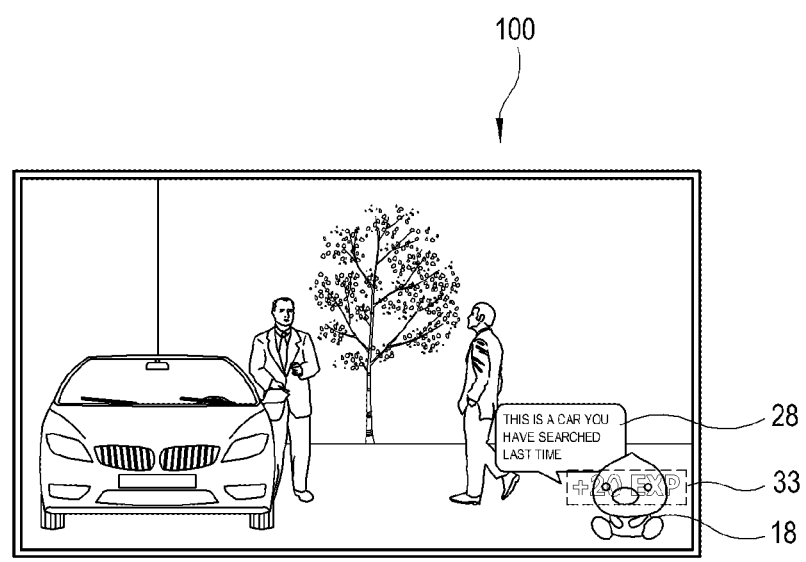
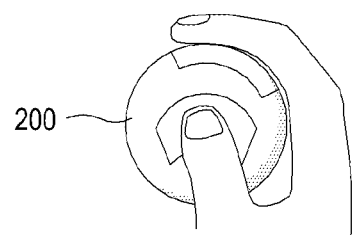

FIG. 31
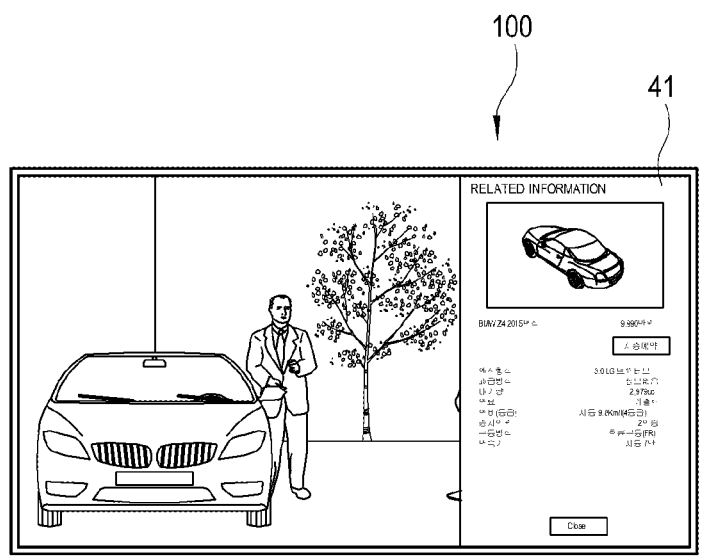
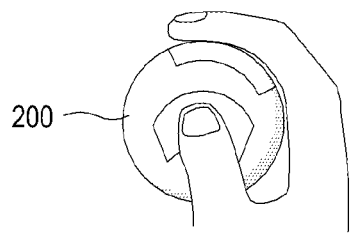

FIG. 32
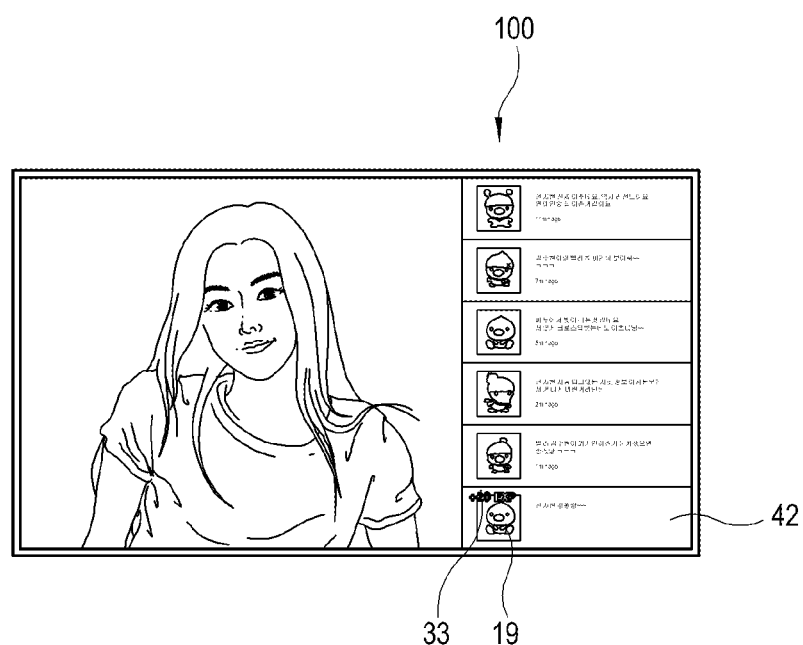
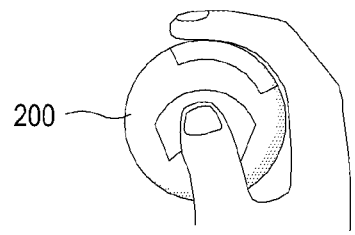

FIG. 33
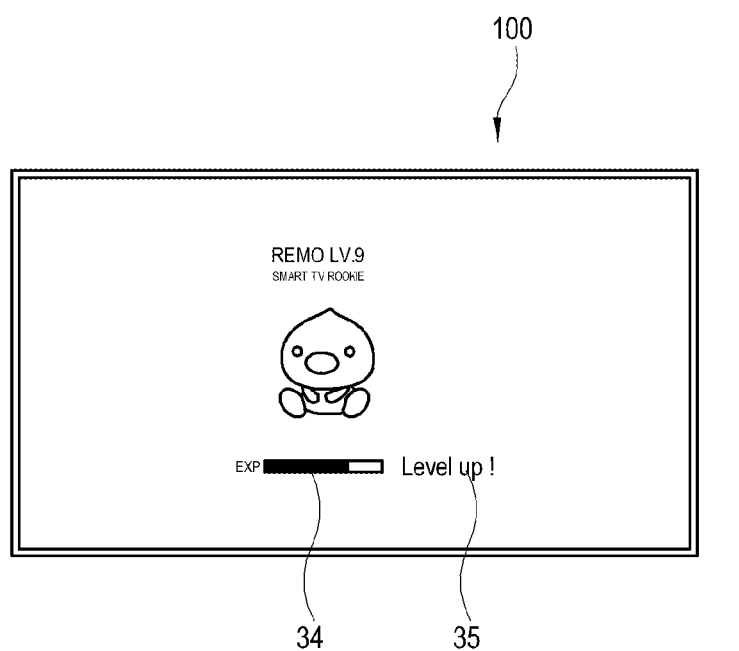
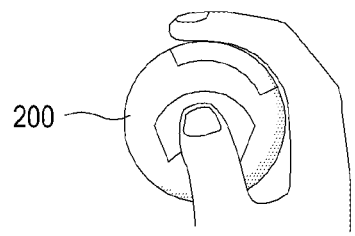

FIG. 34
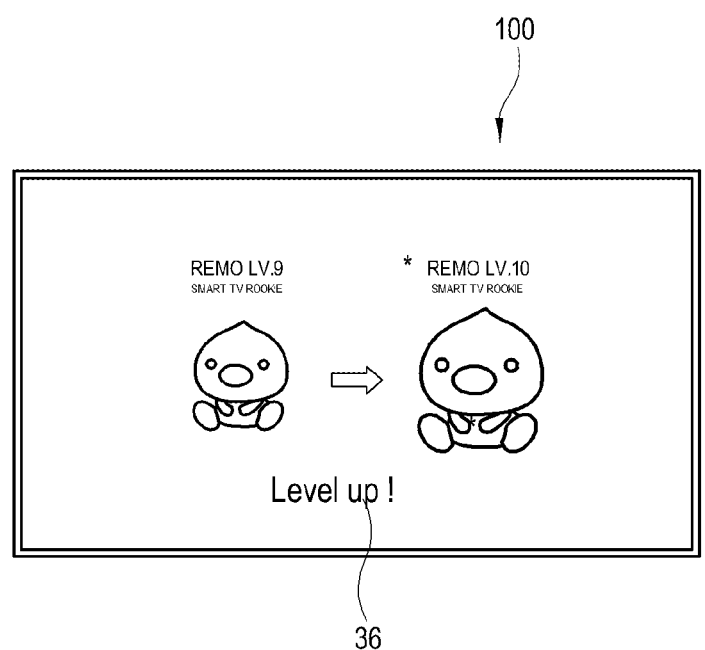
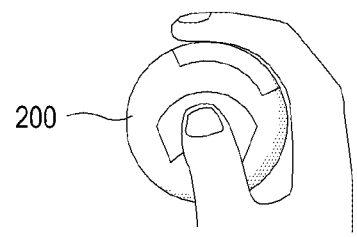

FIG. 35
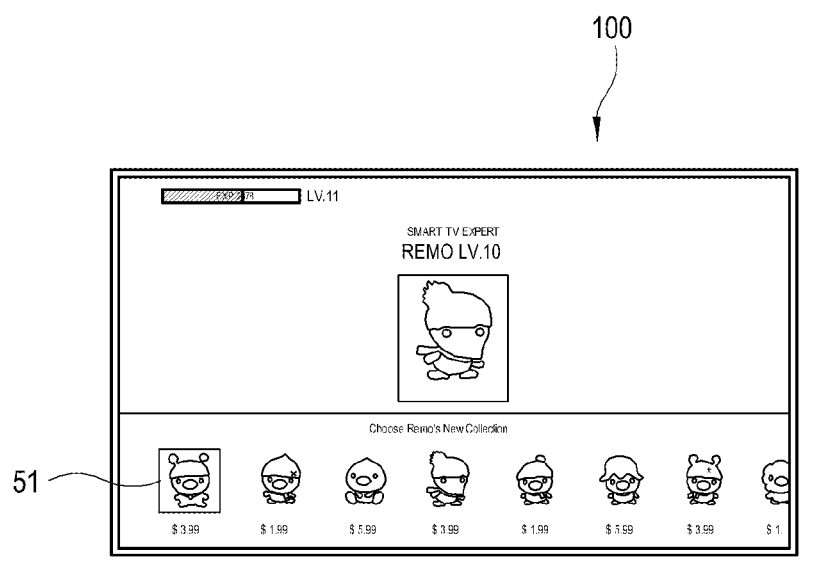
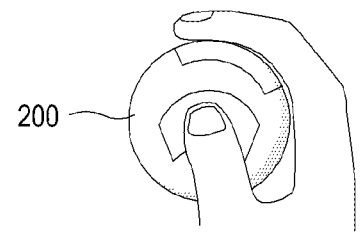

FIG. 36
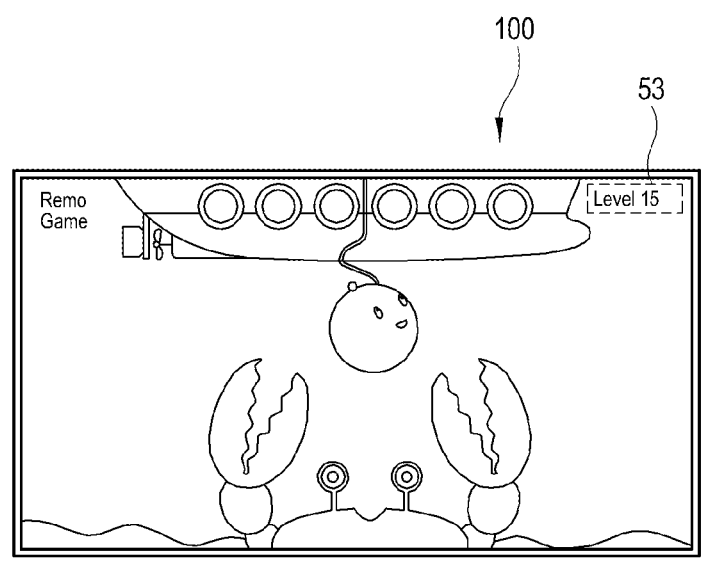
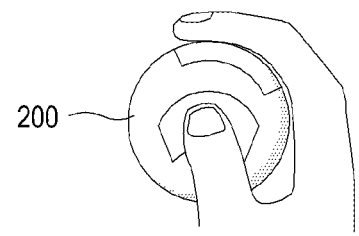

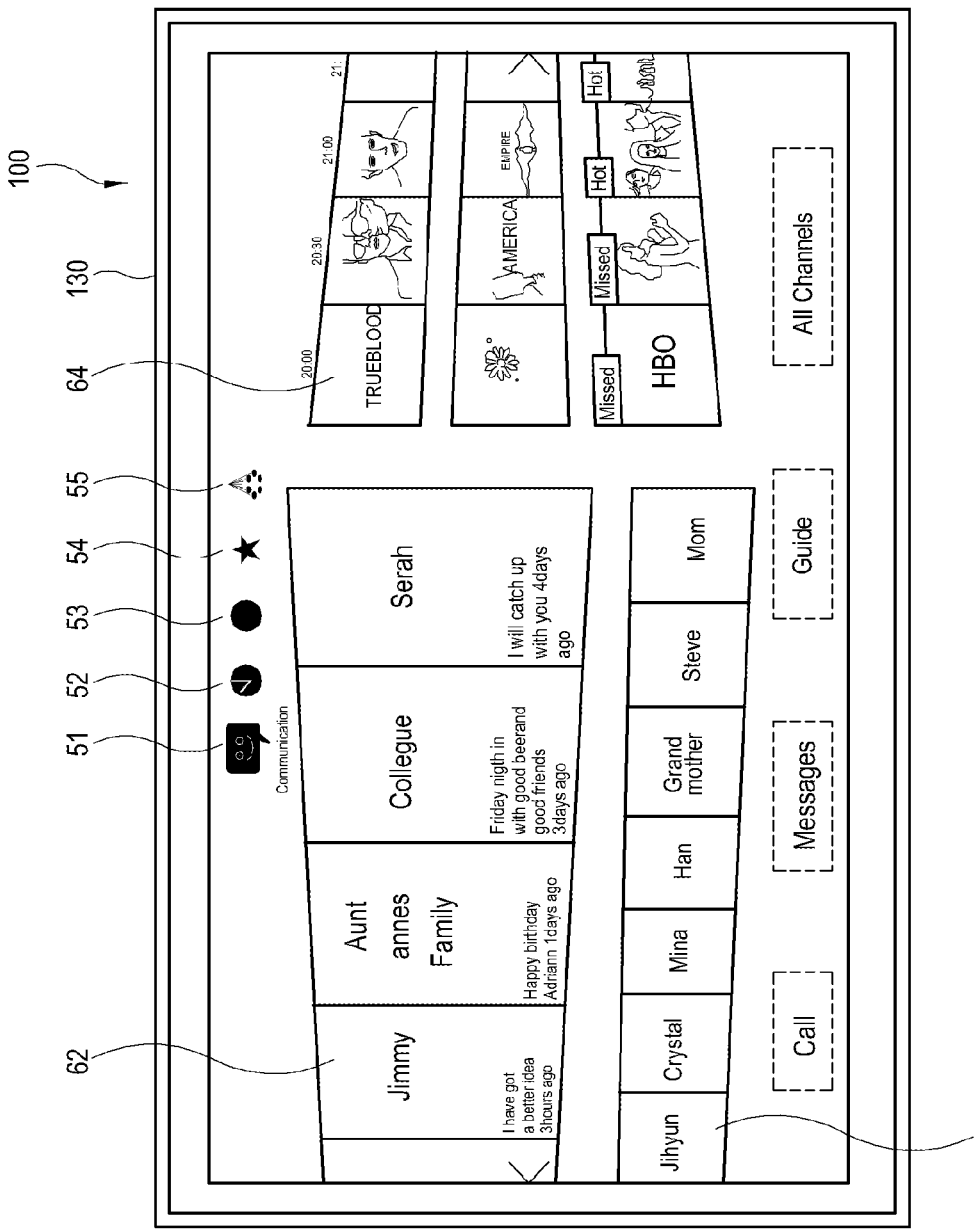
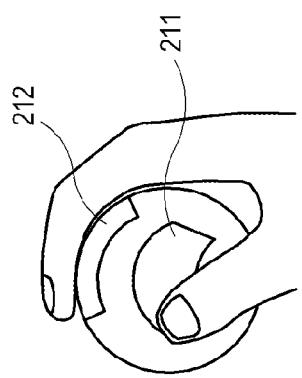
FIG. 41

FIG. 43
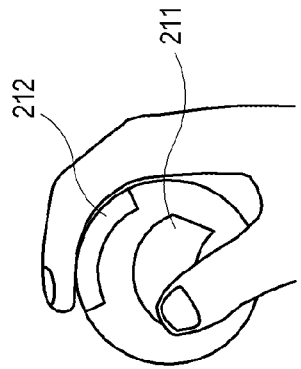
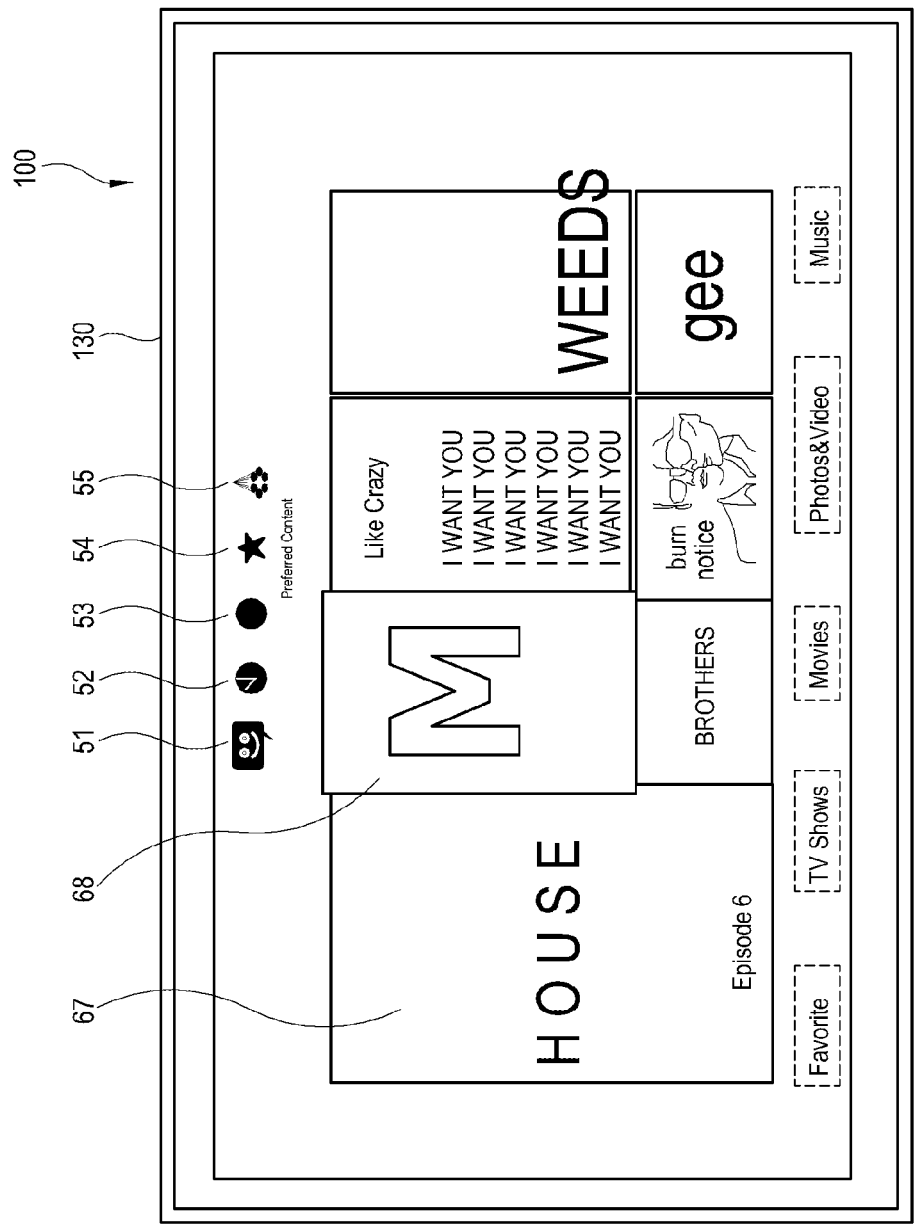

INPUT APPARATUS, DISPLAY APPARATUS AND CONTROL METHOD THEREOF

CROSS-REFERENCE TO RELATED APPLICATION

This application is based on and claims priority under 35 U.S.C. §119 to Korean Patent Application No. 10-2015-0039192, filed on Mar. 20, 2015 in the Korean Intellectual Property Office, the disclosure of which is incorporated by reference herein in its entirety.

BACKGROUND

Field

Apparatuses and methods of the disclosure relate generally to an input apparatus, a display apparatus and a control method thereof, and for example to an input apparatus, a display apparatus and a control method thereof, in which a movable input apparatus is used to receive a user input and a user interface corresponding to the input apparatus is displayed.

Description of Related Art

A display system is a system that displays an image based on an image signal received from the exterior or generated by itself, and includes a plurality of apparatuses classified corresponding to functions, centering around a display apparatus provided with a display panel for displaying an image. In the display system, various kinds of apparatuses may be combined in accordance with functions to be achieved. For example, the display system may include the display apparatus and an input apparatus for issuing various commands to the display apparatus.

Such an input apparatus may be achieved by a remote controller for a television (TV) or the like display apparatus. A user may operate various buttons, a touch sensor, etc. provided on the remote controller to control operations of the display apparatus.

The input apparatus such as the remote controller is mostly small and separated from a main body such as the TV, and may be placed anywhere in a house. Therefore, the input apparatus is frequently hard to find when it is needed for a user to view a TV or the like, and this is inconvenient for him/her.

Further, to comply with the current trend of requiring a human interface device that puts emphasis on communion with a user, demand for smooth communication, i.e. interaction between an apparatus and a user has been on the rise in the display system.

SUMMARY

According to an aspect of an example embodiment, an input apparatus for a display apparatus is provided, comprising: an input device configured to receive a user's input; communication circuitry configured to communicate with the display apparatus; a driver including, for example, a motor, configured to apply a driving force to drive the input apparatus to move; and at least one processor configured to control the driver to move the input apparatus to a preset location corresponding to a user's location in response to a preset event so that a user can take and use the input apparatus. Thus, the input apparatus comes to a user, and there is no need of looking for the remote controller, thereby enhancing a user's satisfaction and convenience.

The input apparatus may have a spherical shape, and be driven by the driver to roll toward the preset location. Thus, the input apparatus can smoothly move to a desired location while passing an uneven floor and stepping over a small protrusion or the like since it is shaped like a sphere suitable for rolling.

The preset event may comprise one or more of a user's operation to a user input device provided in the display apparatus, a user's input using another terminal apparatus paired with at least one of the display apparatus and the input apparatus, a user's voice, a user's motion and a user who is in front of the display apparatus. Thus, the input apparatus starts moving in various ways, and it is convenient for a user to take and use the input apparatus.

The preset location may comprise a first location distant from a front of the display apparatus by a first distance, and a second location distant from the first location by a second distance. Thus, two-step movement makes it possible to move to a more precise location.

The at least one processor may be configured to control the driver to move the input apparatus from the preset location to a third location by a third distance if the input apparatus is not picked up by a user or does not sense an obstacle in the preset location. Thus, even though there is difference between a previously moved location and a user's actual location, it is possible to move the input apparatus again to the actual location.

The input apparatus may further comprise a storage in which a value corresponding to the preset location is stored, wherein at least one processor updates the stored value with a value corresponding to a location where the input apparatus is picked up by a user or senses an obstacle. Thus, it is possible to learn a user's location, and enhance a user's satisfaction through updated information.

The user input device comprises at least one touch sensor for sensing a user's touch input. Thus, a user's operation is possible based on the touch input.

The touch sensor may comprise a first area configured to sense a pressure or motion due to touch with a first finger; and a second area configured to sense a pressure or motion due to touch with a second finger, and the first area and the second area are respectively positioned corresponding to the first finger and the second finger when the input apparatus which is spherical is held in one hand. Thus, the input apparatus is convenient for a user to operate since it is designed suitably for a user's body, i.e. a hand of holding the input apparatus.

The at least one processor may be configured to control the communication circuitry to transmit a command corresponding to one of channel change and volume control to the display apparatus in response to a swiping operation to the first area, and to transmit a command corresponding to the other one of the channel change and the volume control to the display apparatus in response to a swiping operation to the second area. Thus, "flick through" corresponds to channel zapping, a user can operate with his/her intuition.

The user input device may comprise a plurality of arrow keys and a trackball at least partially exposed to the outside of the input apparatus. Thus, various user inputs are allowed.

The input apparatus may further comprise output circuitry configured to operate corresponding to operations of the input apparatus, wherein the output circuitry comprises at least one of a vibrator, a light emitting diode, and a sound output unit. Thus, a user can easily recognize the operation state of the input apparatus.

The input apparatus may further comprise a sensor including one or more of a fingerprint sensor, a heartbeat sensor, a temperature/humidity sensor, a vibration sensor, a gravity sensor, a gyroscope sensor, a geomagnetic sensor, an acceleration sensor and a direction sensor, wherein the communication circuitry is configured to transmit a value sensed by the sensor to one or more of the display apparatus and another terminal apparatus paired with at least one of the display apparatus and the input apparatus, so that one or more of fingerprint recognition, heart rate check, exercising amount check, temperature and humidity check and sleeping time check can be performed based on the transmitted values. Thus, the input apparatus with the sensors can be utilized in various fields such as user authentication, health care, etc.

According to an aspect of an example embodiment, a display apparatus is provided, comprising: a display configured to display an image; communication circuitry configured to communicate with a movable input apparatus; and at least one processor configured to identify at least one user who uses the input apparatus in response to a user's input to the input apparatus, and to control the display to display a user interface corresponding to the input apparatus and the identified user. Thus, a user can feel direct communication with the input apparatus and thus friendliness or familiarity between a user and the input apparatus increases.

The user interface may comprise a virtual character icon configured to provide at least one service to a user. Thus, a user can have more friendliness or familiarity toward the character icon and the input apparatus, and relate with the input apparatus.

The character icon may comprise a plurality of character icons, and the plurality of character icons respectively provide customized services to a plurality of users. Thus, a user can have an attachment to the character icon and variously utilize the character icon, and competition between users is possible using the character icon.

The display may display broadcasting contents, and the at least one processor may provide information about the displayed broadcasting contents through the character icon. Thus, a user is not bored and a transfer effect becomes higher.

A user may participate in a mission through the character icon, and the at least one processor may increase a level the character icon in response to the participation in the mission. Thus, a user can have an interest in using the character icon.

The character icon may be purchasable, and the at least one processor may increase a level the character icon in response to the purchase of the character icon. Thus, new profit creation is possible by sale of contents.

The communication circuitry may be configured to communicate with a different apparatus paired with at least one of the display apparatus and the input apparatus, and the at least one processor may be configured to control the display to display a function screen for controlling the different apparatus in response to a user's input to the input apparatus, and to control the communication circuitry to transmit a command for controlling the different apparatus. Thus, the input apparatus and the display apparatus may be used to control another apparatus included in a smart home system.

According to an aspect of an example embodiment, a method of controlling an input apparatus communicating with a display apparatus is provided, the method comprising: receiving a preset event; and moving the input apparatus to a preset location corresponding to a user's location in response to the preset event so that a user can take and use the input apparatus. Thus, the input apparatus comes to a user, and there is no need of looking for the remote controller, thereby enhancing a user's satisfaction and convenience.

The input apparatus may have a spherical shape and comprise a driver for providing driving force, and the moving the input apparatus to the preset location may comprise driving the input apparatus by the driver to roll toward the preset location. Thus, the input apparatus can smoothly move to a desired location while passing an uneven floor and stepping over a small protrusion or the like since it is shaped like a sphere suitable for rolling.

The preset event may comprise one or more user operations to a user input device provided in the display apparatus, a user's input using another terminal apparatus paired with at least one of the display apparatus and the input apparatus, a user's voice, a user's motion and a user who is in front of the display apparatus. Thus, the input apparatus starts moving in various ways, and it is convenient for a user to take and use the input apparatus.

The preset location may comprise a first location distant from a front of the display apparatus by a first distance, and a second location distant from the first location by a second distance. Thus, two-step movement makes it possible to move to a more precise location.

The method may further comprise moving the input apparatus from the preset location to a third location by a third distance if the input apparatus is not picked up by a user or does not sense an obstacle in the preset location. Thus, even though there is difference between a previously moved location and a user's actual location, it is possible to move the input apparatus again to the actual location.

The method may further comprise: storing a value corresponding to the preset location; and updating the stored value with a value corresponding to a location where the input apparatus is picked up by a user or senses an obstacle. Thus, it is possible to learn a user's location, and enhance a user's satisfaction through updated information.

The user input apparatus may comprise at least one touch sensor for sensing a user's touch input. Thus, a user's operation is possible based on the touch input.

The touch sensor may comprise a first area configured to sense a pressure or motion due to touch with a first finger; and a second area configured to sense a pressure or motion due to touch with a second finger, and the first area and the second area are respectively positioned corresponding to the first finger and the second finger when the input apparatus which is spherical is held in one hand. Thus, the input apparatus is convenient for a user to operate since it is designed suitably for a user's body, i.e. a hand of holding the input apparatus.

The method may further comprise transmitting a command corresponding to one of channel change and volume control to the display apparatus in response to a swiping operation to the first area; and transmitting a command corresponding to the other one of the channel change and the volume control to the display apparatus in response to a swiping operation to the second area. Thus, "flick through" corresponds to channel zapping, a user can operate with his/her intuition.

According to an aspect of an example embodiment, a method of controlling a display apparatus is provided, the method comprising: receiving a user's input to a movable input apparatus; identifying at least one user who uses the input apparatus in response to the received user input; and displaying a user interface corresponding to input apparatus and the identified user. Thus, a user can feel direct communication with the input apparatus and thus friendliness or familiarity between a user and the input apparatus increases.

The user interface may comprise a virtual character icon configured to provide at least one service to a user. Thus, a user can relate to the input apparatus through various utilizations.

The character icon may comprise a plurality of character icons, and the plurality of character icons may respectively provide customized services to a plurality of users. Thus, a user can have an attachment to the character icon and variously utilize the character icon, and competition between users is possible using the character icon.

The method may further comprise displaying broadcasting contents in the display apparatus; and providing information about the displayed broadcasting contents through the character icon. Thus, a user is not bored and a transfer effect becomes greater.

The method may further comprise participating in a mission through the character icon, and increasing a level of the character icon in response to the participation in the mission. Thus, a user can have an interest in using the character icon.

The method may further comprise purchasing the character icon; and increasing the level of the character icon in response to the purchase of the character icon. Thus, new profit creation is possible by sale of contents.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein:

FIGS. 22 to 25 and FIGS. 27 to 37 are diagrams illustrating example images displayed on a display of a display apparatus;

FIGS. 38 to 43 are diagrams illustrating example screens displayed on a display of a display apparatus;

DETAILED DESCRIPTION

Figure 1:
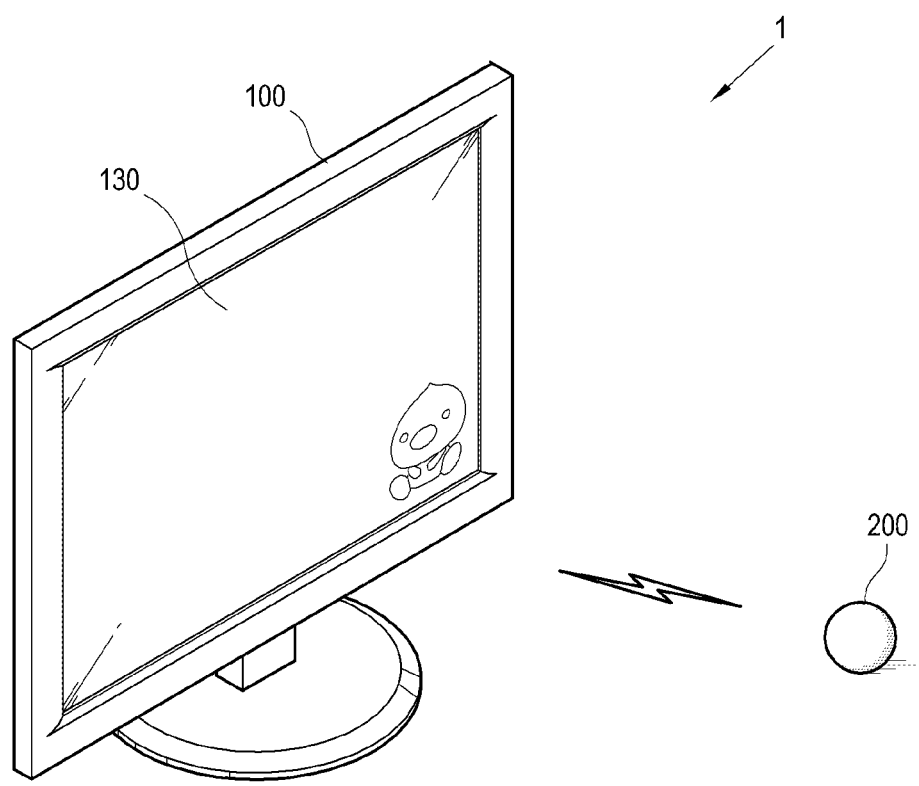
FIG. 1 is a diagram illustrating an example of a display system.

Below, example embodiments will be described in greater detail with reference to accompanying drawings FIG. 1 is a diagram illustrating an example of a display system.

As illustrated in FIG. 1, a display system 1 according to an example embodiment includes a display apparatus 100 which processes an image signal in accordance with preset processes and displays an image based on the processed image signal, and an input apparatus 200 which generates a command/data/information/signal previously set for remotely controlling the display apparatus 100 and transmits the generated command/data/information/signal to the display apparatus 100.

This example relates to the display system 1 in which the display apparatus 100 may, for example, be a television (TV) that displays a broadcast image based on a broadcast signal/broadcast signal/broadcast information/broadcast data received from a transmitter of a broadcasting station, and the input apparatus 200 may, for example, be a remote controller. However, the kind of images to be displayable on the display apparatus 100 is not limited to the broadcast image. For example, the display apparatus 100 may display a moving image, a still image, an application, an on-screen display (OSD), a user interface (UI or also referred to as a 'graphic user interface (GUI)') for controlling various operations, etc. based on a signal/data received from various types of image sources (not shown).

According to this example embodiment, the display apparatus 100 may be achieved by, for example, a smart TV or internet protocol (IP) TV, or the like. The smart TV is capable of receiving and displaying a broadcast signal in real time, which has a web-browsing function to search and consume various contents through Internet while displaying the broadcast signal in real time and thus provides a convenient user environment. Further, the smart TV may have an open software platform to provide an interactive service to a user. Therefore, the smart TV can provide a user with various contents, for instance, applications corresponding to predetermined services, through the open software platform. Such an application refers to an application program for providing various services, for example, social network service (SNS), finance, news, weather, maps, music, movie, game, electronic book, etc.

The disclosure may be applied to another display system in which the display apparatus is a monitor connected to a computer and the input apparatus is a system for communicating with the computer.

The input apparatus 200 may, for example, be an external apparatus capable of wirelessly communicating with the display apparatus 100, and the wireless communication may include, for example, Bluetooth, radio frequency (RF), Zigbee, infrared communication, etc. The input apparatus 200 may transmit a preset command to the display apparatus 100 when it is operated by a user.

Figure 2:
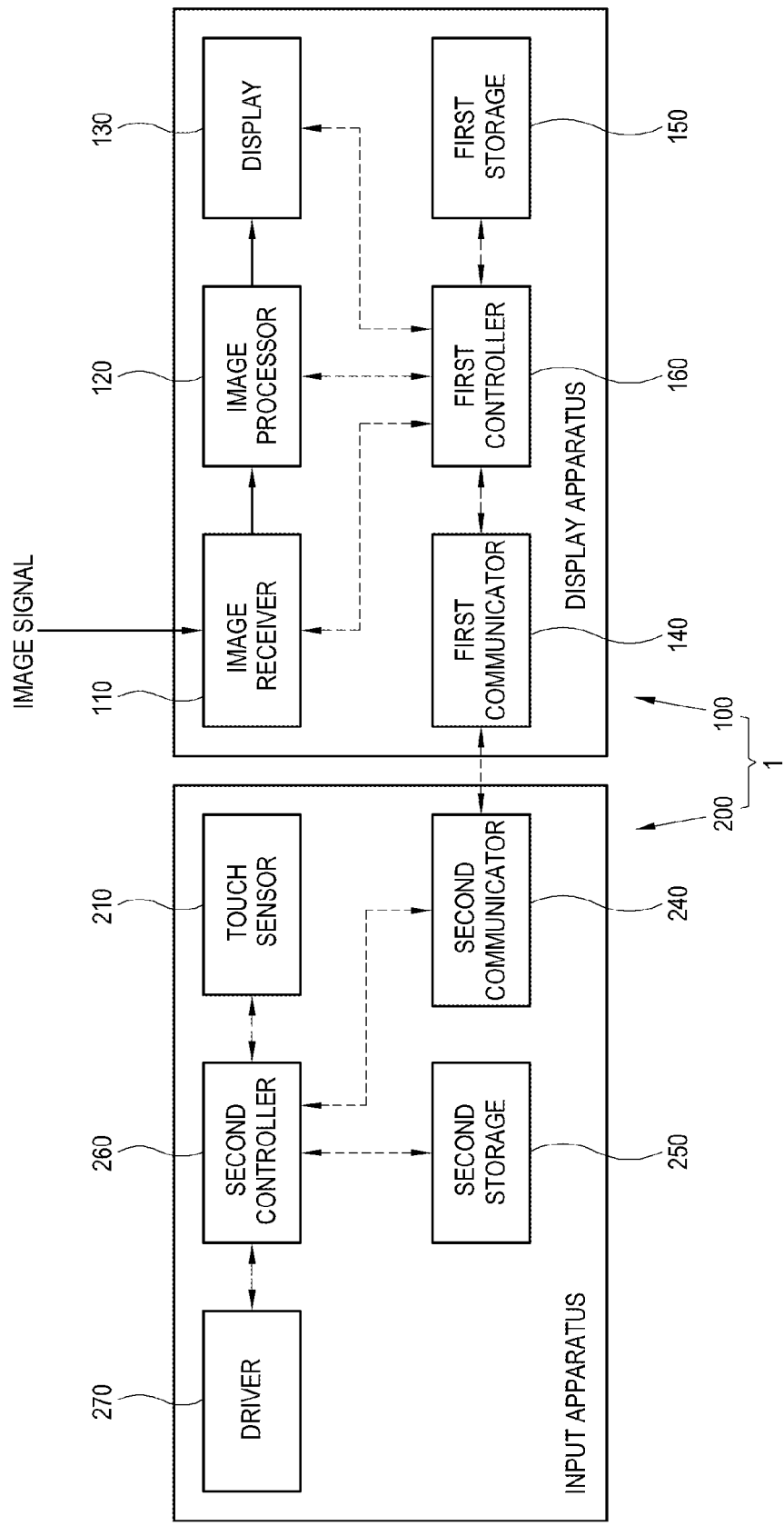
FIG. 2 is a block diagram illustrating an example display system.

For example, the input apparatus 200 in this example may have a spherical shape like a ball as illustrated in FIG. 1, and may be rotatable and movable using an internal driver (see 270 of FIG. 2).

FIG. 1 and the following examples illustrate that the input apparatus 200 has a spherical shape, but these embodiments are not limited to the input apparatus 200 having an almost spherical shape. For example, the input apparatus 200 may have an elliptical cross-section or may be mounted with a wheel or the like moving means.

For example, the following examples to be described below are just examples variously applicable in accordance with the types of systems, and do not limit the present disclosure.

The input apparatus 200 in this example may be made of silicon rubber or the like elastic material without limitation. The surface, i.e. the outer circumference of the input apparatus 200 is rough so that friction increases when the input apparatus 200 rolls. Alternatively, the outer circumference may be patterned to increase the friction.

The input apparatus 200 in this example includes a touch sensor 210 for receiving a user's touch input as a user input device. Thus, the display apparatus 100 may be controlled to display an image on a display 130 in response to information about a user's touch input received from the input apparatus 200.

In addition to the touch sensor 210, the input apparatus 200 in this example may further include a motion sensor (not shown) for sensing its own motion caused by a user, and a button input unit (not shown) having a numerical key, a menu key and the like buttons. The motion sensor may include, for example, a gyro-sensor, an angular-velocity sensor, and a geomagnetic sensor. The motion sensor and the button input unit may be included in the user input device.

Examples where the input apparatus 200 has the button input unit will be described in greater detail below with reference to FIGS. 8 to 13.

The display apparatus 100 and the input apparatus 200 according to this example will be described below with reference to FIG. 2. FIG. 2 is a block diagram illustrating an example display system 1.

As illustrated in FIG. 2, the display apparatus 100 may include, for example, an image receiver (e.g., including receiver circuitry) 110 for receiving an image signal, an image processor (e.g., including processing circuitry) 120 configured to process the image signal received from the image receiver 110, the display (e.g., including a display panel and circuitry for driving the display) 130 for displaying an image based on the image signal processed by the image processor 120, a first communicator (e.g., including communication circuitry) 140 for communicating with the exterior, a first storage (e.g., a memory) 150 for storing data, and a first controller 160 configured to control the display apparatus 100.

The input apparatus 200 includes, for example, the touch sensor 210 for receiving a user's touch input, a second communicator (e.g., including communication circuitry) 240 for communicating with the exterior, a second storage (e.g., a memory) 250 for storing data, a second controller 260 configured to control the second communicator 240 to transmit a corresponding command based on sensed results of the touch sensor 210 to the display apparatus 100, and a driver 270 for providing a driving force to drive the input apparatus 200 to move. Alternatively, the second storage 250 may be excluded.

The display apparatus 100 will be described in greater detail below.

The image receiver 110 receives an image signal and transmits it to the image processor 120. The image receiver 110 may be variously achieved based on the formats of the received image signal and the types of the display apparatus 100. For example, the image receiver 110 may receive a radio frequency (RF) signal from a broadcasting station (not shown) wirelessly, or may receive an image signal of composite video, component video, super video, SCART, high definition multimedia interface (HDMI) standards by a wire. The image receiver 110 may include a tuner to be tuned to a channel corresponding to a broadcast signal if the image signal is the broadcast signal.

Further, the image signal may be received from an external apparatus. For example, the image signal may be output from a personal computer (PC), an audio/video (AV) system, a smart phone, a smart pad, or the like external apparatus. In addition, the image signal may be based on data received through Internet or the like network. In this example, the display apparatus 100 may perform network communication through the first communicator 140, or may further include a separate network communicator. The image signal may be based on data stored in the first storage 150 that may be nonvolatile, such as, for example, a flash memory, a hard disk drive, etc. The first storage 150 may be provided inside or outside the display apparatus 100. If the first storage 150 is placed outside the display apparatus 100, a connector (not shown) may be additionally provided to connect with the first storage 150.

The image processor 120 may be configured to perform various image processing processes previously set with respect to an image signal. The image processor 120 outputs the processed image signal to the display 130, thereby displaying an image on the display 130.

There is no limit to the kind of image processing processes performed by the image processor 120. For example, the image processing processes may include decoding corresponding to various image formats, de-interlacing, frame refresh rate conversion, scaling, noise reduction for improving image quality, detail enhancement, line scanning, etc. The image processor 120 may be achieved by an individual group for independently performing each of the processes (e.g., various processing circuitry, such as, for example a CPU, GPU or the like), or may be achieved by a system-on-chip (SoC) where various functions corresponding to such processes are integrated.

The display 130 displays an image based on an image signal processed by the image processor 120. There is no limit to the type of display 130. For example, the display 130 may be achieved by liquid crystal, plasma, a light emitting diode (LED), an organic light-emitting diode (OLED), a surface-conduction electron-emitter, a carbon nano-tube (CNT), nano-crystal, or the like various displays.

The display 130 may include additional elements based on its type. For example, if the display 130 is achieved by the liquid crystal display, the display includes a liquid crystal display (LCD) panel (not shown), a backlight unit (not shown) for emitting light to the LCD panel, and a panel driver (not shown) for driving the panel (not shown).

In this example, the display 130 can display a user interface (UI) including menu items of the display apparatus 100. A user may operate the touch sensor 210 while viewing the menu items displayed on the display 130. Further, the display 130 may display various contents including a web page corresponding to a menu item selected by the input apparatus 200.

The display apparatus 100 in this example may display a virtual character icon, which provides at least one service as a user interface to a user, on the display 130. Through the input apparatus 200, a user can interact with the character icon displayed on the display 130. The display apparatus 200 can provide various personalized services to a user through the character icon.

The first communicator 140 transmits a command/data/information/signal from the input apparatus 200 to the image processor 120. Further, the first communicator 140 may transmit the command/data/information/signal from the first controller 160 to the input apparatus 200.

In this example, the first communicator 140 may receive a command corresponding to change in at least one value among coordinates, e.g. an X coordinate and a Y coordinate with regard to touch input to the touch sensor 210 of the input apparatus 200.

The first communicator 140 may, for example, employ wireless communication for the communication between the display apparatus 100 and the input apparatus 200. The wireless communication may use, for example, Bluetooth, radio frequency (RF), Zigbee, infrared and the like communications.

According to this example, the first communicator 140 is provided inside the display apparatus 100, but is not limited thereto. Alternatively, the first communicator 140 may be provided in the form of a dongle or a module and detachably coupled to a connector (not shown) of the display apparatus 100.

The first storage 150 stores data under control of the first controller 160, and there is no limit to the kind of data. The first storage 150 may, for example, be achieved by a flash memory, a hard-disc drive and the like nonvolatile storage medium. The first storage 150 is accessed by the first controller 160, and thus the first controller 160 performs reading/recording/modifying/deleting/updating/etc. the data.

The data stored in the first storage 150 may for example include not only an operating system for operating the display apparatus 100, but also various applications, image data, additional data, etc. executable under the operating system.

The first storage 150 in this example may further store operation information about change (increase or decrease) in coordinate values due to the touch input on first and second areas (see, e.g., 211 and 212 in FIGS. 3 to 7) of the touch sensor 210 in the input apparatus 200 in sync with an image displayed on the display 130.

For example, the operation information may be set and stored so as to change a channel up or down in response to increase or decrease of at least one coordinate value between the X coordinate and the Y coordinate on the first area 211, and to turn a volume up or down in response to increase or decrease of at least one coordinate value between the X coordinate and the Y coordinate on the second area 212.

If a web page is displayed on the display 130, the operation information may be set and stored so as to move the web page to the previous page or the next page in response to increase or decrease of at least one coordinate value between the X coordinate and the Y coordinate on the first area 211, and to scroll the web page up or down in response to increase or decrease of at least one coordinate value between the X coordinate and the Y coordinate on the second area 212.

If a setting menu for the display apparatus 100 is displayed on the display 130, the operation information may be set and stored so as to move a focus or pointer, which indicates a currently selected menu among the setting menus, up or down in response to increase or decrease of at least one coordinate value between the X coordinate and the Y coordinate on the second area 212, and to move the focus or pointer left or right in response to increase or decrease of at least one coordinate value between the X coordinate and the Y coordinate on the first area 211.

In this example, the operation information about various screens on the display 130 may be tabulated and stored in the first storage 150, and may be changed in settings by a user.

The first controller 160 may be configured to control various elements of the display apparatus 100. For example, the first controller 160 may be configured to control the image processor 120 to perform image processing processes, and to perform control corresponding to a command received from the input apparatus 200, thereby controlling the whole operations of the display apparatus 100.

The first controller 160 includes at least one processor. At least one processor loads a program from a nonvolatile memory (e.g. ROM) into a volatile memory (e.g. RAM).

The first controller 160 in this example may be achieved by at least one universal processor such as a central processing unit (CPU), an application processor (AP), a microcomputer (MICOM) or the like, and for example runs a program loaded into the RAM by a predetermined algorithm stored in the ROM, thereby performing various operations of the display apparatus 100.

The first controller 160 of the display apparatus 100 may be achieved by a single processor, e.g. a CPU, and the CPU may be provided to implement various functions implementable in the display apparatus 100, for example, to control for various image processing processes, such as decoding, demodulating, scaling, etc.; to respond to a command received from the input apparatus 200 including the remote controller; to provide control for wired/wireless network communication with the external apparatus; voice recognition; a video call using a camera and a microphone; and so on.

The first controller 160 may include a program for implementing a certain function supported in the display apparatus 100, e.g. a function for sensing an external input in a power saving mode, and a chip, e.g. an integrated circuit (IC) chip provided as a dedicated processor for executing the corresponding program.

When a command corresponding to a user's touch input is received from the input apparatus 200 through the first communicator 140, the first controller 160 in this example embodiment may be configured to control the display 130 to display a corresponding image.

When a command corresponding to a user's operation is received from the input apparatus 200, the first controller 160 may be configured to control the display 130 to display a corresponding screen based on the operation information stored in the first storage 150. For example, if a user's input to the first area 211 or the second area 212 of the touch sensor 210, e.g., a command corresponding to change in the coordinate value is received, the controller 160 may be configured to control the display 130 to display a screen changed in response to the user's input.

Examples of the screen in the display 130 will be described in more detail through the following examples.

The input apparatus 200 and a user's input using the input apparatus 200 will be described in greater detail below.

Figure 3:
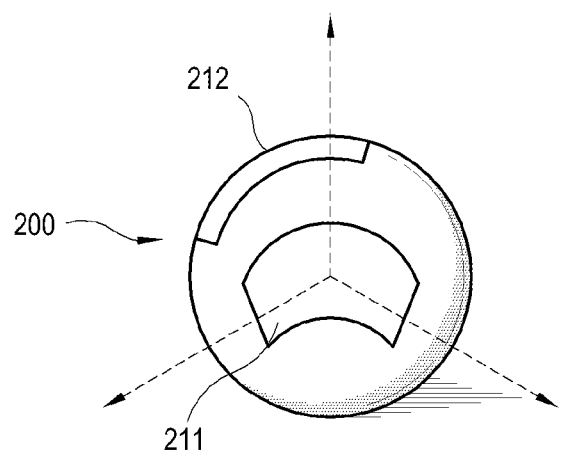
FIG. 3 is a perspective view of an example input apparatus.
Figure 4:
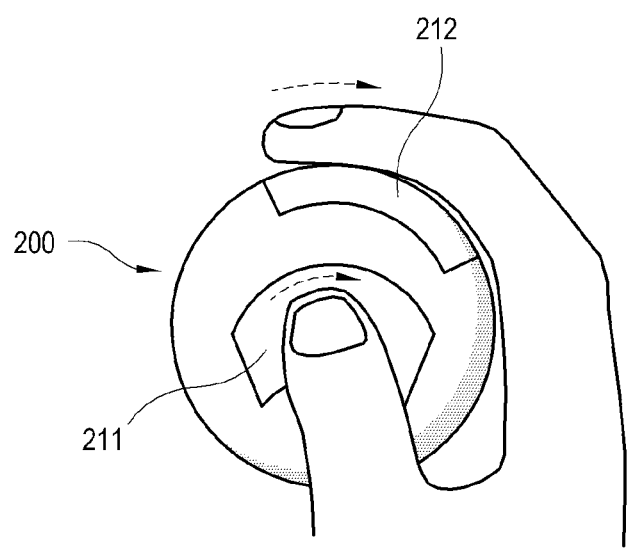
FIGS. 4 to 6 are views illustrating example user input using the input apparatus of FIG. 3.
Figure 5:
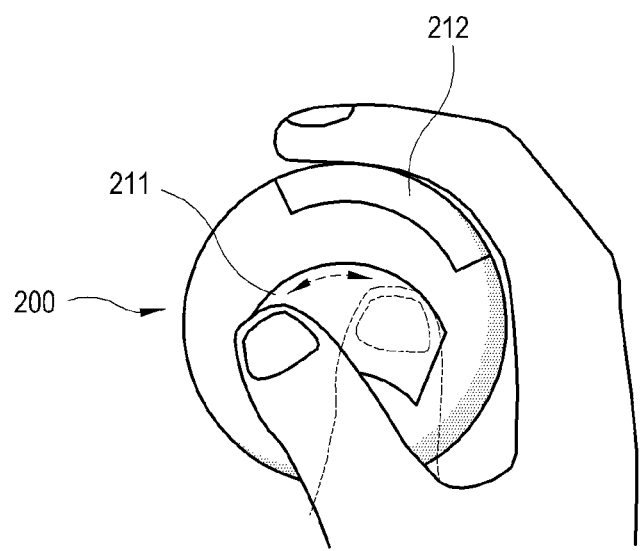
Figure 6:
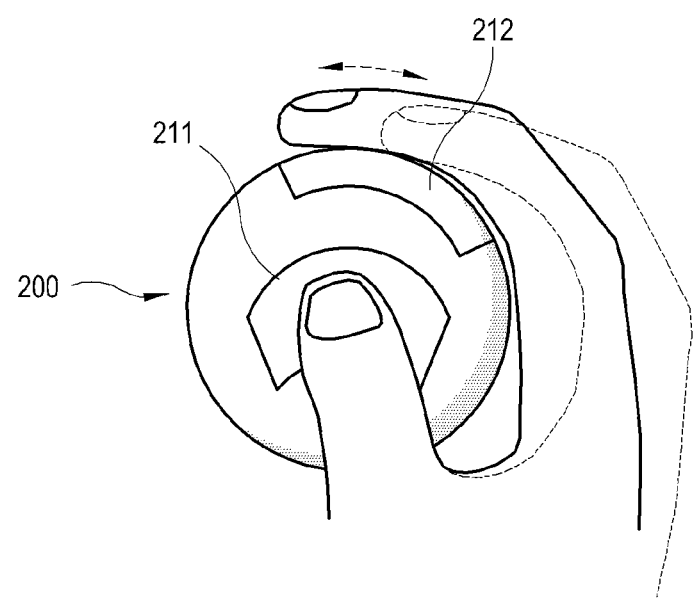
Figure 7:
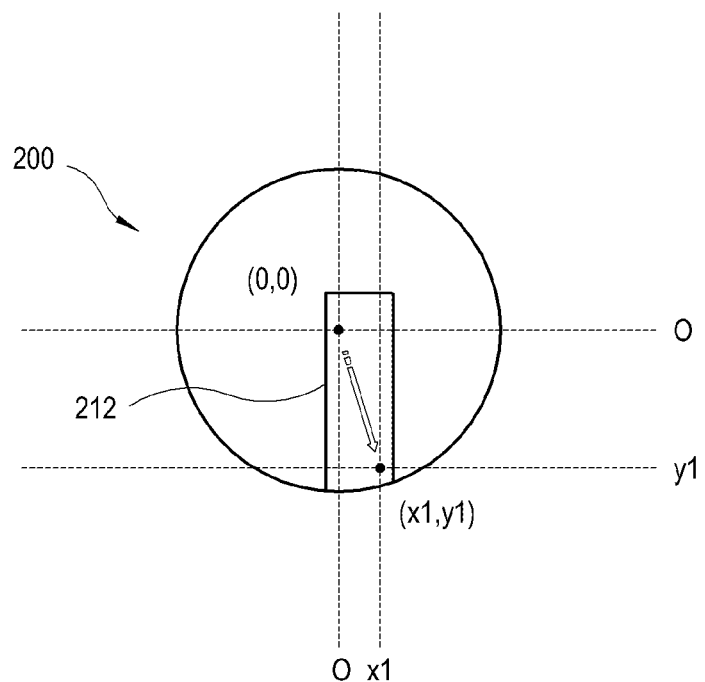
FIG. 7 is a plan view of the example input apparatus, viewed from the top, which is a view illustrating an example user input sensed through a touch sensor.

FIG. 3 is a perspective view illustrating an example input apparatus 200, FIGS. 4 to 6 are diagrams illustrating an example user input using the input apparatus 200 of FIG. 3, and FIG. 7 is a plan view illustrating example input apparatus 200, viewed from the top, which is a view illustrating example user input sensed through a touch sensor 210.

In this example embodiment, the input apparatus 200 has a spherical shape like a ball as illustrated in FIG. 3, and is driven by a driving force provided by the driver 270 placed therein to roll and move toward a user's desired location.

The input apparatus 200 in this example embodiment may for example be shaped like a sphere having a diameter of, for example, 3.5 cm to 6 so that a user can easily hold the input apparatus 200 in one hand. FIG. 3 illustrates that the input apparatus 200 is almost spherical by way of an example, without limitation. The input apparatus according to an example embodiment may have any structure that can be driven by the driver 270 to roll and move independently.

According to the examples illustrated in FIGS. 3 to 7, the input apparatus 200 may be operated, for example, in a touch mode where it operates in accordance with a user's touch input to the touch sensor 210. The input mode of the input apparatus 200 may further include a general mode where it operates in based on a user's operations to a button input unit, and a gesture mode where it operates based on motions of the input apparatus. If the input apparatus 200 has a plurality of input modes, the input mode may alter in response to a user's preset operation (for example, press of a predetermined key button, touch input of greater than predetermined strength or length, motion input of greater than predetermined strength, etc.). It will be understood that various user inputs are applicable without limitation.

The touch sensor 210 may be achieved, for example, by a touch pad for sensing a user's touch input, and may include an input area in an upper portion and a sensor in a lower portion. There may be various touch inputs, and thus a user's touch input may include tapping, clicking requiring a stronger touch than the tapping, double-clicking, dragging that moves by a predetermined distance in a touched state, sliding, flicking, swiping, etc. The inputs such as the dragging, the sliding, the flicking, the swiping, etc. may be achieved by press to touch the touch sensor 210 with a finger (or a touch pen), move by a predetermined distance, and release from the touch sensor 210, in which the move may include straight and curved motions.

When the touch sensor 210 senses a user's touch input, the second controller 260 may be configured to generate a command corresponding to the sensed touch input, and to transmit it to the display apparatus 100 through the second communicator 240. The touch sensor 210 senses a user's touch input using his/her finger, a touch pen, etc.

In this example embodiment, the touch sensor 210 may include, for example, a plurality of areas, for example, the first area 211 and the second area 212 to receive a user's touch input.

For example, as illustrated in FIG. 4, the first area 211 and the second area 212 are respectively provided at positions corresponding to a first finger (e.g., a thumb) and a second finger when the spherical input apparatus 200 is held in a palm. The first area 211 senses pressure or motion due to touch with the first finger, and the second area 212 senses pressure or motion due to touch with the second finger.

In the example illustrated in FIG. 4, the first finger is a thumb, and the second finger is an index finger, but is not limited thereto. For example, the input apparatus 200 according to this example embodiment may have various structures designed to facilitate the touch input in consideration of a structure of a human body while a user holds the input apparatus 200 in his/her hand for operations.

FIG. 4 illustrates that the first area 211 and the second area 212 are positioned with respect to a right hand, but is not limited thereto. Alternatively, the first area and the second area may be respectively provided at positions corresponding to the first finger and the second finger with respect to a left hand for a left-handed person.

The first area 211 and the second area 212 are provided to readily receive the touch input including, for example, swiping operations of the first finger and the second finger, respectively.

For example, referring to FIG. 5, the first area 211 may have a fanwise shape along a swiping path of a thumb. Thus, a user may operate the first area 211 by moving his/her thumb left and right as illustrated in FIG. 5.

Referring to FIG. 6, the second area 212 may include, for example, a lengthwise shape along a swiping path of an index finger. Thus, a user may operate the second area 212 by moving his/her index finger up and down along the lengthwise direction of the second area 212 as illustrated in FIG. 6.

The second communicator 240 may communicate with the display apparatus 100, and may support communication standards corresponding to that of the first communicator 140. For example, the second communicator 240 transmits and receives a predetermined command through wireless communication such as Bluetooth, RF, Zigbee, infrared communication, etc.

A second storage 250 stores various data to be accessed by the second controller 260. For example, the second storage 250 in this example stores coordinate information set with respect to the first area 211 and the second area 212 of the touch sensor 210 to sense a user's touch input. The second storage 250 may further store information about the input modes of the input apparatus 200.

The second storage 250 may be achieved by a flash memory or the like nonvolatile storage-medium. The second storage 250 may be accessed by the second controller 260, and thus the second controller 260 may be configured to perform reading/recording/modifying/deleting/updating/etc. the data. As necessary, the second storage 250 may be excluded.

The second controller 260 may be configured to control operations with regard to various elements of the input apparatus 200. For example, the second controller 260 may be configured to sense various user inputs and to transmit corresponding commands to the display apparatus 100 through the second communicator 240, thereby controlling the whole operations of the input apparatus 200. Thus, the display apparatus 100 carries out the operations corresponding to the received commands.

The second controller 260 includes at least one processor. At least one processor loads a program from a nonvolatile memory (e.g. ROM) into a volatile memory (e.g. RAM).

The second controller 160 in this example may be achieved by at least one universal processor such as an application processor (AP) and a microcomputer (MICOM), or a chip, e.g. an IC chip provided as a dedicated processor, and for example runs a program loaded into the RAM by a predetermined algorithm stored in the ROM, thereby performing various operations of the input apparatus 200.

When the touch sensor 210 senses a user's touch input, the second controller 260 in this example may be configured to transmit a corresponding control signal to the display apparatus 100 through the second communicator 140.

The second controller 260 of the input apparatus 200 in this example may be configured to transmit a command corresponding to the touch input in the first area 211 and a command corresponding to the touch input in the second area 212 to the display apparatus 100.

For example, the second controller 260 may be configured to perform control so that a command corresponding to channel change, i.e. channel zapping (CH− or CH+) can be transmitted to the display apparatus 100 in response to the swiping operation in the first area 211, and a command corresponding to volume adjustment, i.e. volume control (VOL− or VOL+) can be transmitted to the display apparatus 100 in response to the swiping operation in the second area 212.

In the foregoing example, the channel change may be assigned to the operation in the first area 211, and the instantaneous channel zapping is thus possible for a user who does "flick through" using the thumb. Therefore, zapping fatigue is relieved even though the number of TV channels increases, and ergonomic and closer interaction between a user and the display apparatus 100 is possible through the input apparatus 200.

The commands to be transmitted from the input apparatus 200 in response to the touch input may be variously assigned to the first area 211 and the second area 212 of the touch sensor 210. For example, the swiping operation in the first area 211 may correspond to the volume control, so that a command of volume up (VOL+) or volume down (VOL−) can be transmitted to the display apparatus 100, and the swiping operation in the second area 212 may correspond to the channel zapping, so that a command of change to the previous channel (CH−) or the next channel (CH+) can be transmitted to the display apparatus 100.

The command transmitted in response to the touch input in the first area 211 or the second area 212 is not limited to the channel zapping or the volume control. For instance, if the first area 211 is strongly tapped twice or double-clicked in the state that a broadcast of a predetermined channel may be displayed in the display apparatus 100, information about the current or following broadcast schedule according to time slots may be displayed with respect to the current channel. Further, if the second area 212 is tapped or clicked once, a command may be issued for displaying information about the contents being currently broadcasted (e.g. casting, a synopsis, broadcasting time and the like information).

Various commands may be transmitted based on contents displayed on the display apparatus 100. For example, if a web page is displayed on the display 130, the previous or next page may be displayed in response to the touch input to the first area 211, or the web page may be scrolled up or down in response to the touch input to the second area 212.

According to an example embodiment, various commands may be set to be issued based on the kinds, strength, directions, moving distance, etc. of touch input to the first area 211 and the second area 212, and this setting may be changed by a user's selection. For convenience of a user, operations to be performed in the display apparatus 100 in response to the touch inputs may be set to be intuitively recognized by a user.

Information about the operations set corresponding to the kinds, strength, directions, moving distance, etc. of touch input to the first area 211 and the second area 212 may be stored in the first storage 150 of the display apparatus 100.

For example, the second controller 260 of the input apparatus 200 may transmit information about an area where the touch input is sensed, i.e. information about whether the touch input is sensed in the first area 211 or the second area 212 to the display apparatus 100 through the second communicator 240 in response to the touch input. The information about the kinds, strength, directions, moving distance, etc. of touch input may be transmitted together.

The first controller 160 of the display apparatus 100 may be configured to determine an area where the touch input is sensed based on the received information, and refer to the setting information stored in the first storage 150, thereby performing an operation set corresponding to the information, for example, volume up or down if the determined area is the second area 212.

According to an example embodiment, the second controller 260 may be configured to set coordinate information with respect to the first area 211 and the second area 212 of the touch sensor 210, and to determine coordinates corresponding to a location where a user's touch input occurs. The second controller 260 may be configured to transmit the determined coordinate information as a predetermined command to the display apparatus 100 via the second communicator 240.

As illustrated in FIG. 7, the second controller 260 of the input apparatus 200 may be configured to sense increase or decrease in a value of the X coordinate and the Y coordinate with respect to the touch input received from the second area 212, and to generate a corresponding command (e.g. an event), thereby transmitting the command to the display apparatus 100 through the second communicator 240.

For example, if there is a swiping input to the second area 212, the second controller 260 may be configured to generate a command (e.g. an event) based on a coordinate value at a press location, a coordinate value at a release location, and whether the coordinate values at the press and release locations are increased or decreased with respect to the X coordinate or the Y coordinate. For example, the second controller 260 may be configured to control the second communicator 240 to send the display apparatus 100 an event of change from a start coordinate value (0, 0) of the press location to an ended coordinate value (x1, y1) of the release location (see, e.g., FIG. 7) together with information corresponding to the second area 212 where the touch input occurs. The first controller 160 of the display apparatus 100 may be configured to control volume down (VOL−) based on the area information and the event of the change in the coordinate value.

The display apparatus 100 may operate corresponding to the touch input to the first area 211.

In the input apparatus 200 according to example embodiments illustrated in FIGS. 2 to 7 is provided with the touch sensor 210 including the first area 211 and the second area 212 as a means for receiving a user's input, but is not limited thereto. For example, in addition, the input apparatus 200 according to an example embodiment may be internally provided with a button input unit.

For example, the input apparatus 200 may include two hemispherical capsules that can be coupled to and separated from each other. The separation surface of each capsule may be formed with a keypad for inputting numerals or letters, or a flexible keypad may be exposed when both capsules are separated. A user may select a channel number or the like through the keypad, so that information about a selected channel can be transmitted to the display apparatus 100 through the second communicator 240, thereby changing the channel.

Further, the input apparatus 200 according to this example may be additionally provided with a motion sensor that includes a gyro-sensor, an angular-velocity sensor, a geomagnetic sensor, etc. therein, and the second controller 260 may be configured to determine motion information based on sensed results of the motion sensor. For example, when a user shakes the input apparatus 200 having the motion sensor, the determined motion information is transmitted to the display apparatus 100 via the second communicator 240 and thus the display apparatus 100 may change a channel randomly in response to the received motion information.

The motion sensor may be provided in a main body of the display apparatus 100. The first controller 160 of the display apparatus 100 may sense a user's hand gesture through the motion sensor provided in the front thereof. The strength of the hand gesture may be determined by one of a moving distance, a moving speed and an area of a moving region of a hand or combination thereof. The first controller 160 may be configured to determine the motion information of the hand gesture based on angular speed and acceleration of the hand sensed by the motion sensor, and amends the determined motion information by comparison with the information stored in the first storage 150. The result of comparison or amendment may be used as a predetermined command for controlling the display apparatus 100.

The input apparatus 200 according to this example may additionally include an audio input unit such as a microphone to receive a voice uttered by a user, a user input device using a hologram, and the like various user input devices. The microphone may sense a frequency swing.

The audio input unit may be provided in the main body of the display apparatus 100, and a video input unit such as a camera may be provided in the front of the display apparatus 100.

In addition, the input apparatus 200 according to this example may receive a user's input based on combination of two or more various user inputs described as above, For example, the input apparatus 200 may be shaken while the second area 212 is being touched. Information about commands corresponding to such various combinations of a user's inputs may be stored in the first storage 150, the second storage 250, or a separate server including a cloud sever or the like.

The driver 270 drives the input apparatus 200 to roll and move. Like a ball, the input apparatus 200 can roll in all directions by the driver 270.

The driver 270 according to this example may include, for example, a motor to which a gyroscope using rotational inertia is applied (hereinafter, referred to as a 'gyro motor'). Since the gyro motor operates with force proportional to rotation speed of an inner circular plate, the input apparatus 200 can step over a low obstacle such as a threshold, an uneven floor, etc. even though its diameter is not large.

The input apparatus 200 may include a weight or a sensor (for example, an accelerating sensor, a gravity sensing sensor, various gyroscope sensors, a geomagnetic sensor, a gravity sensor, an acceleration sensor, a digital compass sensor, a proximity sensor, an optical sensor, etc.) so as to keep its balance while rolling and moving. The rolling movement of the input apparatus 200 will be described in greater detail below with reference to FIG. 14 to FIG. 16.

Figure 8:
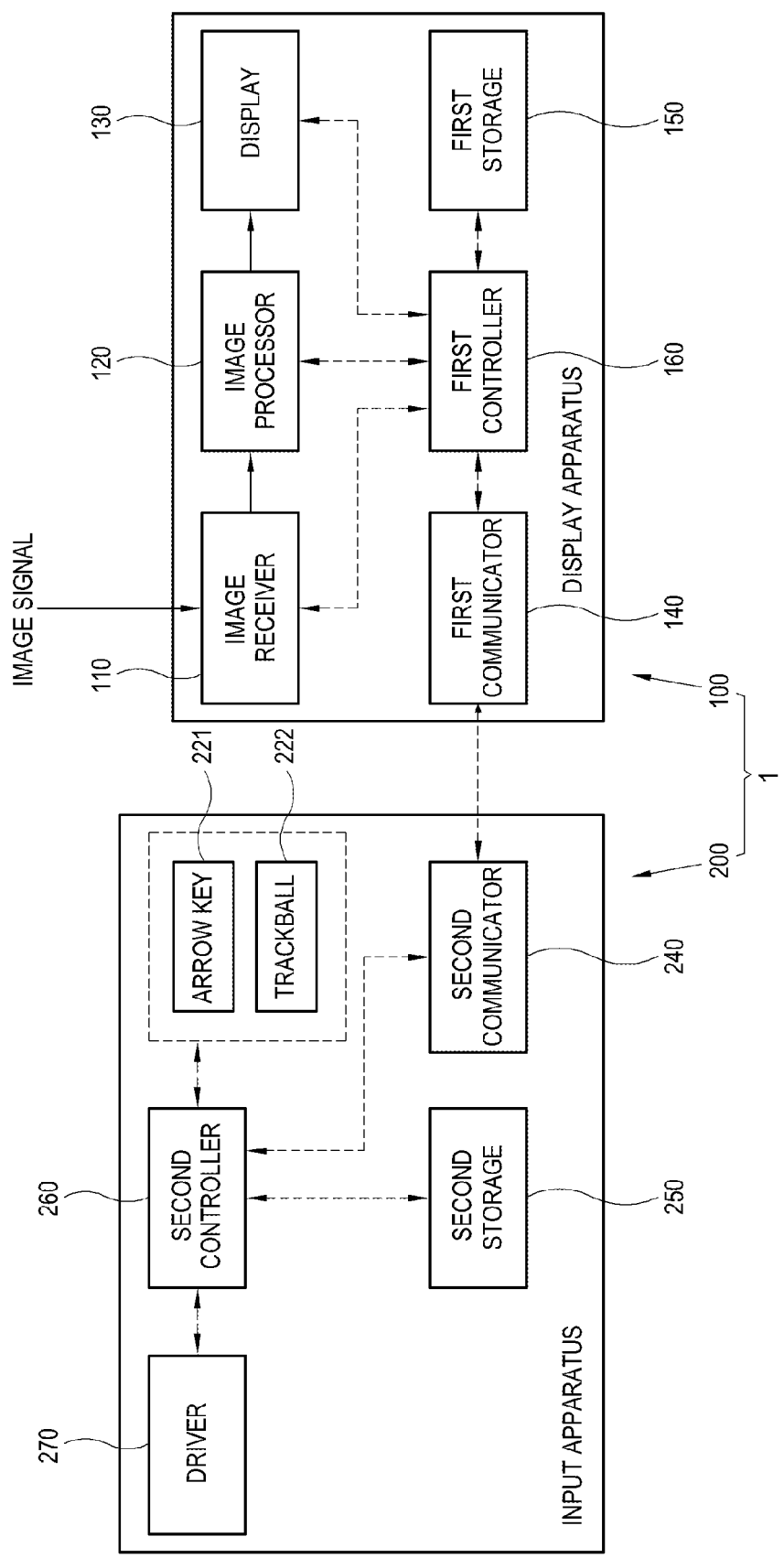
FIG. 8 is a block diagram illustrating an example display system.

FIG. 8 is a block diagram illustrating an example display system 1;

In comparison with the example illustrated in FIG. 2, the example illustrated in FIG. 8 is characterized in that the input apparatus 200 includes arrow keys 221 and a trackball 222 as the user input device. Therefore, the elements except the arrow keys 221 and the trackball 222 have the same terms and reference numerals as those shown in FIG. 2, and repetitive descriptions thereof will be avoided as necessary. Further, the following examples illustrated in FIG. 14 to FIG. 46 are applied to the input apparatus 200 illustrated in FIG. 2 to FIG. 7, the input apparatus 200 shown in FIG. 8 to FIG. 12, and the input apparatus 200 of FIG. 13.

Figure 9:
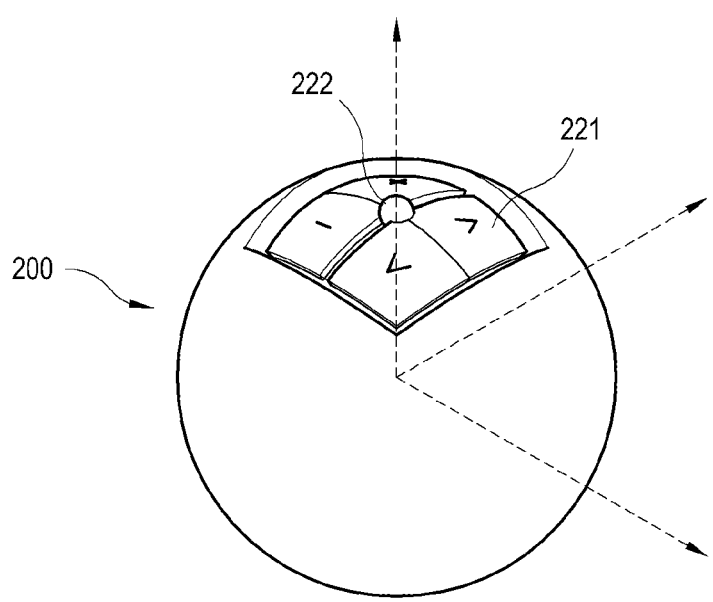
FIG. 9 is a perspective view illustrating an example input apparatus.
Figure 10:
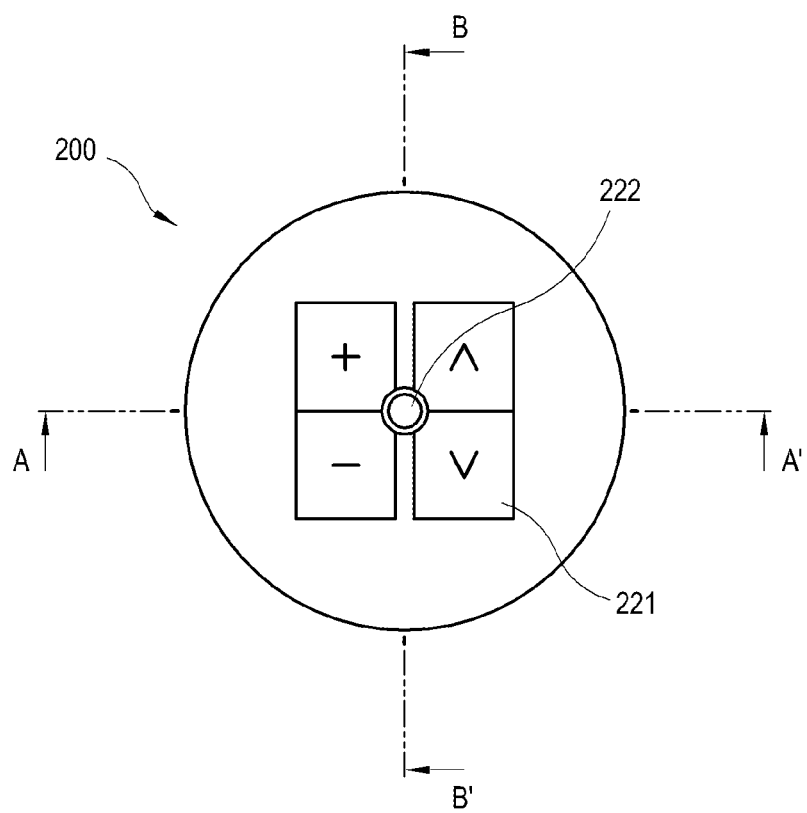
FIG. 10 is a plan view of the example input apparatus of FIG. 9, viewed from the top.
Figure 11:
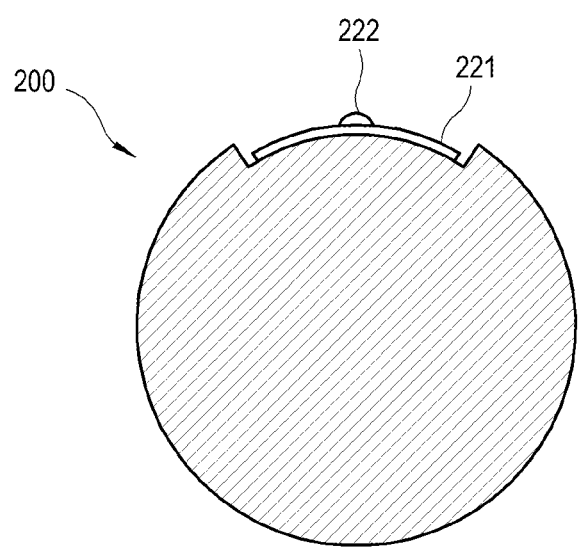
FIGS. 11 and 12 are cross-sectional views of the example input apparatus of FIG. 9.
Figure 12:
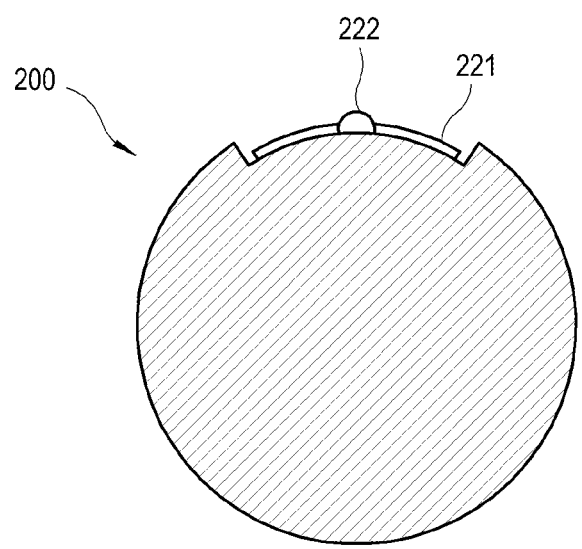

FIG. 9 is a perspective view illustrating an example input apparatus; FIG. 10 is a plan view of the example input apparatus of FIG. 9, viewed from the top; and FIGS. 11 and 12 are cross-sectional views of the input apparatus of FIG. 9.

As illustrated in FIG. 9 and FIG. 10, the input apparatus 200 may include a plurality of arrow keys 221 and a trackball 222 on, for example, the outer circumference thereof.

FIGS. 9 and 10 illustrate that the arrow keys 221 and the trackball 222 are provided on a top surface of the input apparatus 200, but is not limited thereto. Since the input apparatus 200 rolls in all directions, the arrow keys 221 and the trackball 222 may be provided anywhere, e.g. on the rear surface, top surface, bottom surface, front surface, lateral surface or the like surface of the input apparatus 200.

FIGS. 9 and 10 illustrate that each arrow key 221 is shaped like a quadrangle, but is not limited thereto. Each arrow key may have various shapes such as a crisscross (+), a diamond (◊), a circle (○), etc.

In this example, FIG. 11 illustrates a cross-sectional view of the input apparatus 200 taken along line A-A' in FIG. 10, and FIG. 12 illustrates a cross-sectional view of the input apparatus 200 taken along line B-B' of FIG. 10.

As illustrated in FIG. 11 and FIG. 12, the input apparatus 200 may be formed with a recessed area, e.g., a groove and the like concaved portion on the outer circumference thereof, and the arrow keys 221 and the trackball 222 may be disposed in the recessed area so that the input apparatus 200 can freely roll in all directions.

In this example, the arrow keys 221 includes left up and down arrow keys (+, −) and right up and down arrow keys (∧, ∨) as illustrated in FIG. 10. A user may issue a command for volume control to the display apparatus 100 by, for example, operating the left up and down arrow keys, and issue a command for channel change by, for example, operating the right up and down arrow keys. For example, the left and the right may be reversed as the input apparatus 200 rolls. As necessary, the left up and down arrow keys may correspond to the channel change, and the right up and down arrow keys may correspond to the volume control.

However, the commands corresponding to the plurality of arrow keys 221 are not limited to the channel change and the volume control. For example, as described above with reference to FIG. 2 to FIG. 7, various commands for movement of a web page, display of broadcast information, etc. may be sent to the display apparatus by a single or combination operation of the plurality of arrow keys 221

The trackball 222 is rotatable up, down, left and right to function, for example, as a mouse pointer, and is at least a portion thereof is exposed to the outside of the input apparatus 200 as illustrated in FIG. 11 and FIG. 12. A user may roll the trackball 222 with a finger while holding the input apparatus 200 in his/her hand, thereby moving a cursor or selecting an item on a screen in the display 130 of the display apparatus 100. A tray may be placed under the trackball 222 and supporting the trackball 222, and sense a user's operation when it is pressed (or clicked).

Figure 13:
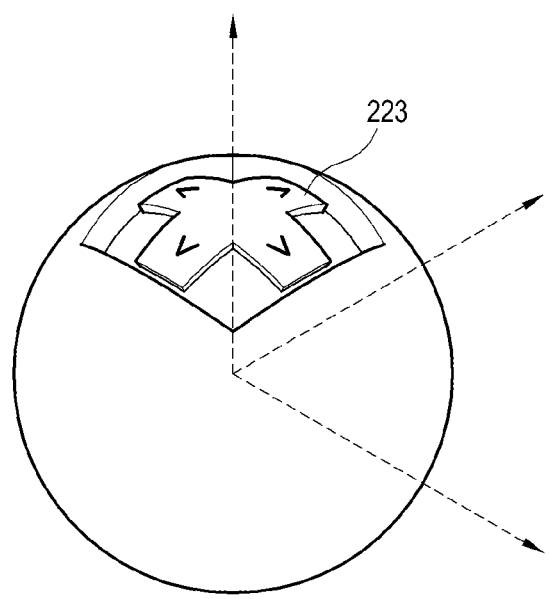
FIG. 13 is a perspective view illustrating an example input apparatus.

FIG. 13 is a perspective view illustrating an example input apparatus 200;

The example of FIG. 13 is different from that of FIG. 9 in a shape of arrow key 223. For example, the arrow keys 223 according to this example have a crisscross shape. Therefore, the elements except the arrow key 223 have the same terms and reference numerals as those shown in FIG. 9, and repetitive descriptions thereof will be avoided as necessary.

As shown in FIG. 13, the arrow key 223 in this embodiment includes a up key (∧), a down key (∨), a left key (<) and a right key (>) corresponding to the up, down, left and right directions, respectively.

The up key (∧) and the down key (∨) may be set, for example, to issue a command of sequentially changing the current channel into the previous channel (CH−) or the next channel (CH+) in response to a user's operation. Further, the left key (<) and the right key (>) may be respectively set, for example, to issue a command of volume control, e.g. volume up (VOL+) or volume down (VOL−) in response to a user's operation.

Although it is not illustrated, a power key, a trackball and the like may be added at the center of the arrow key 223, and there are no limits to their position and shape.

The input apparatus 200 illustrated in FIG. 9 to FIG. 13 may further include one or more of the touch sensor, the motion sensor and the audio input unit. The operations of the display apparatus 100, which are performed when a user operates the arrow keys 221, 223, the trackball 222, the touch sensor, the motion sensor, the audio input unit and the like, may be also implemented as described with reference to FIG. 2 to FIG. 7.

Like the input apparatus 200 illustrated in FIG. 2 to FIG. 7, the input apparatus 200 illustrated in FIG. 8 to FIG. 13 may freely roll in all directions by receiving a driving force from the driver 270 such as, for example, the gyro motor described above.

Figure 14:
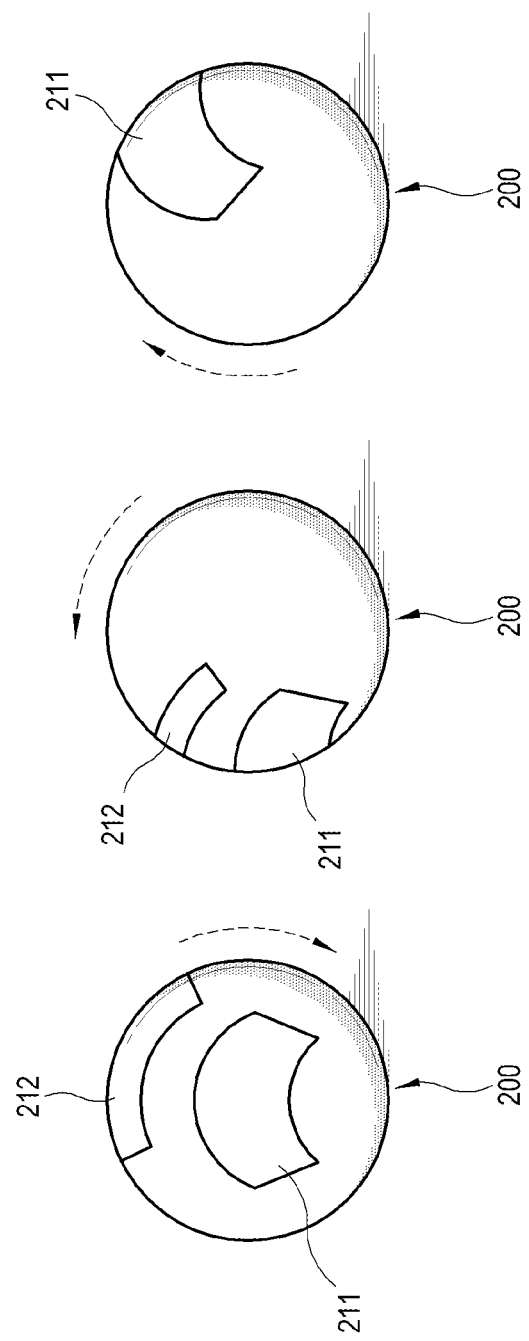
FIGS. 14 to 16 are diagrams illustrating example movement of the input apparatus.
Figure 15:
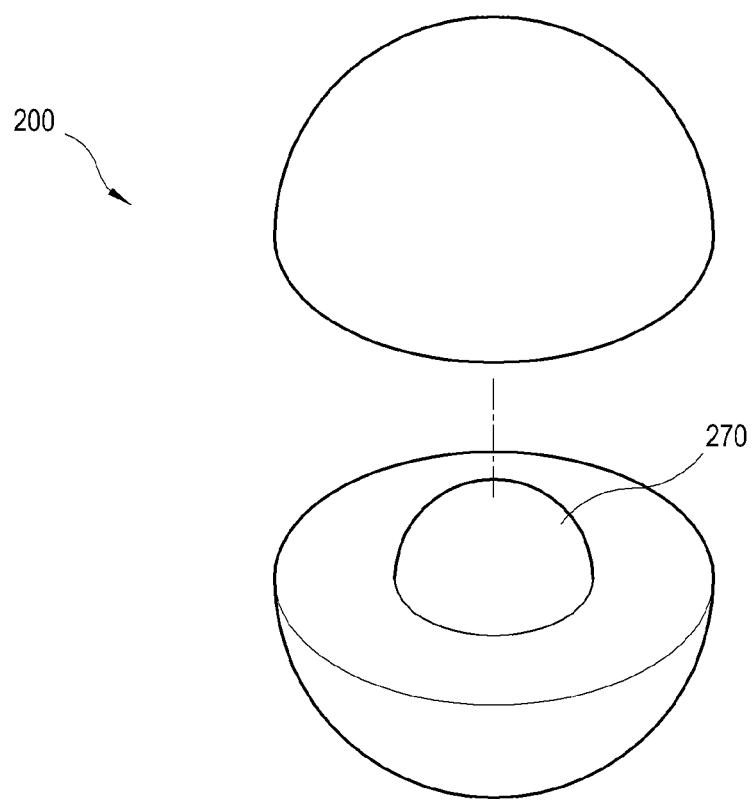
Figure 16:
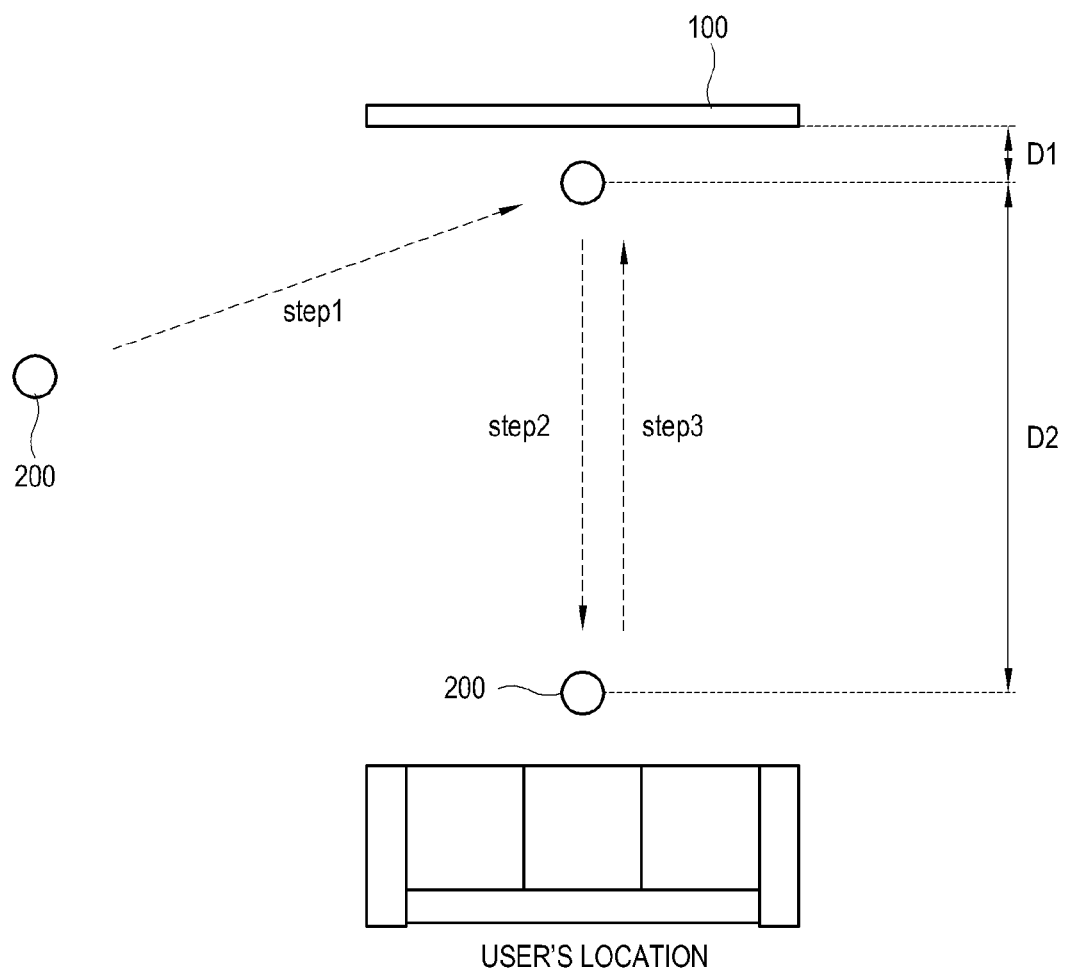

FIGS. 14 to 16 illustrate movement of the input apparatus according to the example embodiments. The moving mechanism of the input apparatus in this example illustrated in FIG. 14 to FIG. 16 is applied to all the input apparatuses according to the foregoing examples illustrated in FIG. 1 to FIG. 8, FIG. 9 to FIG. 11, and FIG. 12.

As illustrated in FIG. 14, the input apparatus 200 according to this example can be driven by the driver (e.g., a gyro motor, gyro driver, or the like) 270 provided therein to freely roll and move in all directions and 360 degrees.

To this end, as illustrated in FIG. 15, the input apparatus 200 may be internally provided with the driver 270 that provides a driving force for movement based on rotation. The driver 270 may further include a weight for keeping its balance while it is rolling, and sensors for sensing the balance and direction change when it is rolling, as well as the gyro motor or the like motor for providing rotational inertia.

The operations, i.e. the rotating direction, speed, angle and the like of the driver 270 may be controlled, for example, by the second controller 260.

In this example, the input apparatus 200 is driven by the driver 270 to roll and move toward a preset location in response to at least one preset event. The preset location to which the input apparatus 200 rolls and moves is a user's location previously set so that the user can get and use the input apparatus 200. For example, referring to FIG. 16, the preset location may be a location where a sofa is placed in a living room.

The preset event may include one or more among a user's operation to a user input device provided in the display apparatus 100, e.g. a control panel provided at a lateral side of a TV; a user's input using another terminal apparatus paired with at least one of the display apparatus 100 and the input apparatus 200; and at least one of a user's voice and a user's gesture. For example, a user's operation to the user input device provided in the display apparatus 100 is not limited to the input using the control panel, but includes an operation to be sensed by a sensor provided in the TV, for example, an operation of hitting the TV.

For example, to watch the TV (e.g., the display apparatus 100), a user may turn on the TV by clicking a power button of the control panel provided on the lateral surface of the TV. Likewise, a user may turn on the TV by various methods, e.g. using another terminal apparatus such as a smart phone or the like being paired with the TV, uttering a voice such as "turn on TV", standing in front of the TV, or making a preset motion for turning on the TV (for example, clenching or opening his/her fist), etc. Further, as necessary, an image sensor of the video input unit such as the camera installed in the TV may be used to sense a user who stands in front of the TV. In the example where a smart phone or the like terminal apparatus is used, the terminal apparatus is paired with the display apparatus 100 so as to transmit and receive a command therebetween.

The first controller 160 of the display apparatus 100 may be configured to control the first communicator 140 to transmit a control command to the input apparatus 200 in response to an event input by a user so that the input apparatus 200 can move to an expected location where s/he is.

The input apparatus 200 may receive the control command through the second communicator 240, and the second controller 260 may be configured to control the driver 270 to move the input apparatus 200 to the preset location in response to the control command received from the display apparatus 100.

For example, the preset location may refer to an expected location where a user is. In consideration of an average dimension of a space where the display apparatus 100 is installed and/or a screen size of the display 130, a value for the preset location may be previously determined at a stage of manufacturing a product, and stored in at least one of the first storage 150 and the second storage 250. Alternatively, at the first operation of the display apparatus 100, the display 130 may display a user interface (UI) for allowing a user to input the dimension of the installation space, and a value for the preset location may be determined based on a user's input/selection using the displayed UI.

As illustrated in FIG. 16, the preset location in this example may include a first location distant from the front of the display apparatus 100 by a first distance D1, and a second location distant from the first location by a second distance D2. For example, the first distance D1 may for instance be a short distance of 40 cm to 50 cm.

In other words, according to an example embodiment, there is a need of controlling the input apparatus 200 to move to a desired location when a user needs the input apparatus 200 for watching the TV or the like operation. However, it may be difficult to specify the current location of the input apparatus 200 according to an example embodiment since the movable spherical input apparatus 200 can roll anywhere in a house.

Therefore, the input apparatus 200 primarily moves to the first location in front of the main body of the display apparatus 100, which is given as a reference location for moving toward a user's desired location (step 1), and secondarily moves to the second location distant from the first location by a predetermined distance, i.e. by the second distance D2, which is given as an expected location where a user is (step 2). For example, the second distance D2 may be previously set in consideration of the average dimension of the space where the display apparatus 100 is installed and/or the screen size of the display 130.

Thus, a user can pick up the input apparatus 200 at the second location. If a user normally picks up the input apparatus 200 at the preset location, the input apparatus 200 sends a control signal, which informs a pickup location and informs that the pickup is completed, to the display apparatus 100 through the second communicator 240 (step 3). For example, the information about the pickup location may be stored in the second storage 250.

The first controller 160 of the display apparatus 100 may be configured to control the first storage 150 to store the information about the pickup location of the input apparatus 200 based on the control signal received from the input apparatus 200.

On the other hand, if the input apparatus 200 is not normally picked up at the preset location, e.g., at the second location, the second controller 260 may be configured to control the driver 270 to drive the input apparatus 200 to roll and move to a third location distant by a third distance from the second location. If the input apparatus 200 is picked up by a user at the third location, information about a pickup location is stored in the second storage 250, and a controls signal, which informs the pickup location and informs that the pickup is completed, is transmitted to the display apparatus 100 through the second communicator 240.

FIG. 16 illustrates an example in which the input apparatus 200 first moves to the first location in front of the display apparatus 100 and then moves to the second location expected as a user's location, but is not limited thereto. Alternatively, the input apparatus 200 may be directly moved to the preset location. For example, if the displayed apparatus 100 is turned on by a user's voice input or by operating a smart phone or the like terminal apparatus, a location corresponding to a user's utterance or the terminal apparatus may be measured, and then the input apparatus 200 is moved to the measured location.

If the input apparatus 200 transmits information about its own location through the second communicator 240, the first controller 160 of the display apparatus 100 may be configured to determine the current location of the input apparatus 200 based on the received information and to determine a direction and distance for movement, thereby transmitting a control command for moving the input apparatus 200 to a predetermined location. The input apparatus 200 may transmit not only the information about its own location information but also driving information, i.e. information about a rolling direction, a speed, etc. to the display apparatus 100.

In addition, according to an example embodiment, when the input apparatus 200 moves to the preset location, e.g., the second location and senses an obstacle, the second controller 260 may be configured to stop driving the rolling and to control the second communicator 240 to send the display apparatus 100 information about the current location where the obstacle is sensed and information that the driving is completed. For example, the obstacle may be a big obstacle that the input apparatus 200 cannot step over, and for example includes a user, a sofa or the like (see FIG. 16).

In this manner, the values stored in the first storage 150 or the second storage 250 are continuously updated based on the information about the location where the input apparatus 200 is picked up or the information about the rolling is stopped.

For example, the pick-up location information or the rolling-stop location information stored in the first storage 150 or the second storage 250 may correspond to time when the input apparatus 200 stops moving by a user's pickup, an obstacle or the like, and may be stored as measured time information.

According to an example embodiment, the input apparatus 200 may stop moving due to a user's pickup or an obstacle before reaching the preset location, i.e. the second location or the third location. In this example, the second controller 260 may be configured to determine this location as a location for stopping the movement of the input apparatus 200, and to store and update this location information (or time information) in the first storage 150 or the second storage 250. For example, the values corresponding to the location information (or the time information) may be stored in an external server, accessible by the display apparatus 100 or the input apparatus 200, as well as a cloud server.

If the input apparatus 200 needs to move again for watching the TV or the like operation, the second controller 260 may be configured to control the driver 270 to move the input apparatus 200 based on the latest stored/updated location information.

As necessary, the information about the locations where the input apparatus 200 has been picked up or stops may be averaged over a predetermined period, and the driver 270 may be controlled to move the input apparatus 200 to the average.

According to an example embodiment, a moving pattern of the input apparatus 200 may be stored, and the input apparatus 200 may be configured to repetitively learn a user's location by itself to thereby automatically roll to an optimum location. Thus, the input apparatus 200 is more convenient since it may be customized for a user.

The foregoing input apparatus 200 may be achieved by a structure internally provided with a charging unit to be charged by a charger 300.

Figure 17:
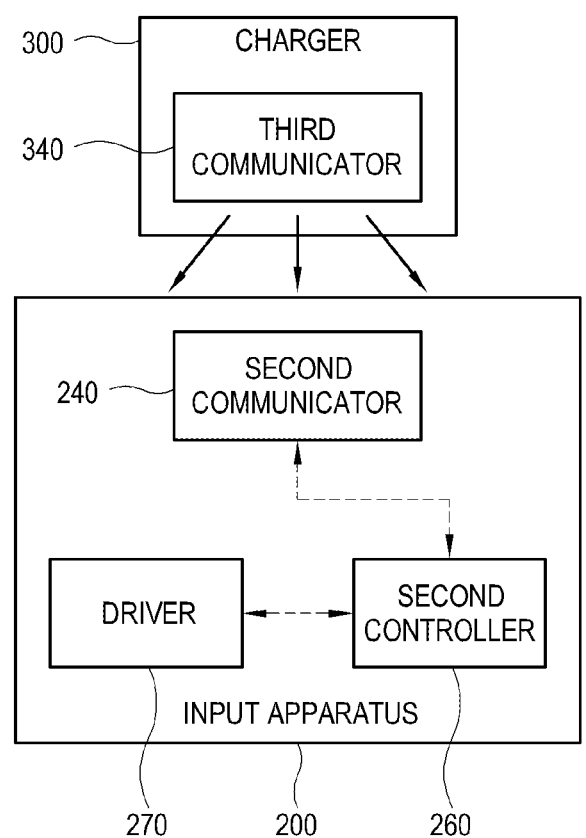
FIGS. 17 to 19 are diagrams illustrating an example method of charging the input apparatus.
Figure 18:
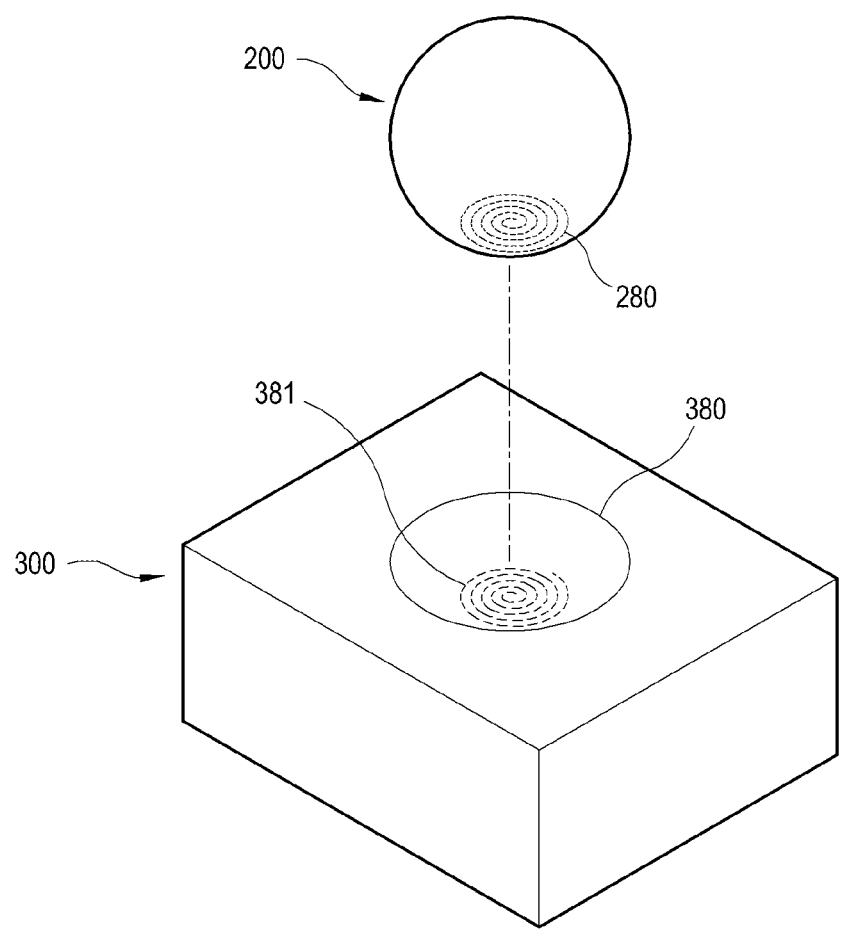
Figure 19:
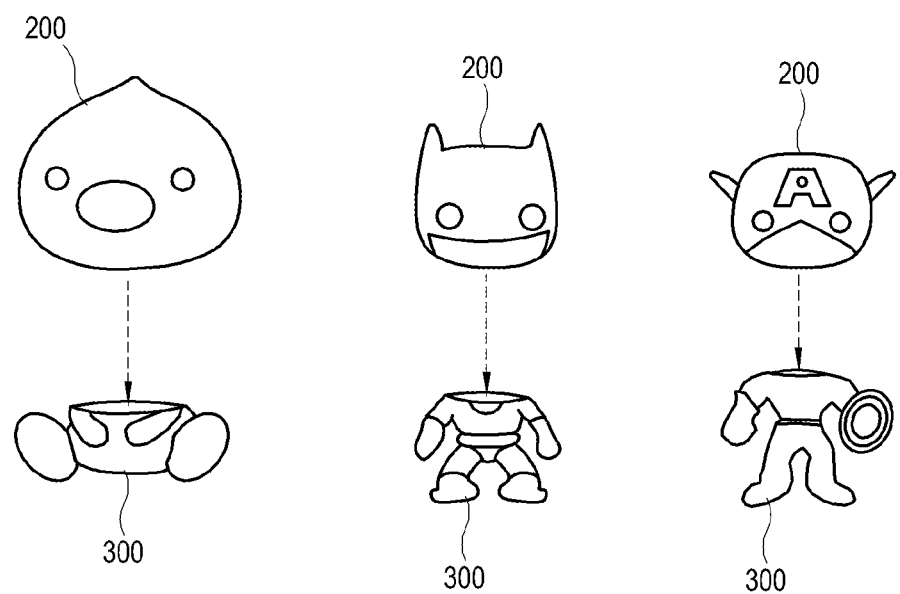

FIGS. 17 to 19 are diagrams illustrating an example method of charging the input apparatus 200.

As illustrated in FIG. 17, a charger 300 may include a third communicator (e.g., including communication circuitry) 340 to communicate with the input apparatus 200. The third communicator 340 may support communication standards corresponding to that of the second communicator 240. For example, the third communicator 340 may be achieved by a wireless communication module that may support wireless communication such as Bluetooth, RF, Zigbee, IR or the like communication.

In this example, the second controller 260 of the input apparatus 200 may be configured to exchange data with the charger 300 and to control the input apparatus 200 to be automatically charged if it is sensed that the input apparatus 200 has a power level lower than a predetermined level.

The charger 300 may transmit a wireless signal through the third communicator 340. The wireless signal may include information about the location of the charger 300, and may be for instance transmitted by a broadcasting method.

The second controller 260 may be configured to control the driver 270 to move the input apparatus 200 to the charger 300 in response to the sensed low power level of the input apparatus 200 or a user's input for the charging.

The second controller 260 may be configured to estimate the position of the charger 300 by analyzing the wireless signal received from the charger 300 through the second communicator 240, and to control the driver 270 to make the input apparatus 200 roll and move to the estimated location. Further, when the input apparatus 200 reaches the charger 300, charging terminals of the charger 300 may connect with charging terminals of the input apparatus 200.

FIG. 17 illustrates that the charging may be automatically performed by direct communication between the input apparatus 200 and the charger 300, but is not limited thereto. Alternatively, the input apparatus 200 may receive a wireless signal from the display apparatus 100 and determine the location of the charger 300 based on the received wireless signal. The input apparatus 200 may be charged by moving to the determined location of the charger 300.

It is difficult to separately provide the charging terminal to the input apparatus 200 since the input apparatus 200 according to an example embodiment has a spherical shape like a marble or a ball.

Accordingly, a wireless charging system as illustrated in FIG. 18 may be preferable. For example, as illustrated in FIG. 18, the charger 300 may be formed with a recessed portion 380 shaped, for example, like a spherical groove to receive the spherical input apparatus 200, and a coil 381 for wirelessly charging power may be provided in the recessed portion 380. Likewise, a built-in coil 280 may be provided in a lower portion of the input apparatus 200 and may receive wireless power energy from the charger 300, thereby performing the charging.

It will be appreciated that all the technically available wireless charging systems are applicable to the disclosure.

According to an example embodiment, the input apparatus 200 and the charger 300 may be variously made to feature characters. For example, as illustrated in FIG. 19, the input apparatus 200 and the charger 300 may form a pair to feature a popular character familiar to a user, thereby allowing him/her to use them in a funny or whimsical way and having an effect on serving as an interior decoration.

In addition, the input apparatus 200 according to an example embodiment may output its operation state in various ways.

Figure 20:
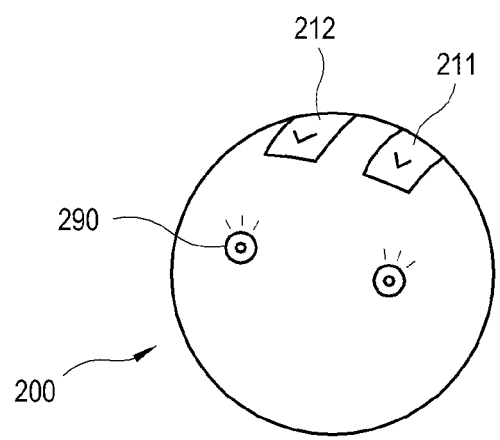
FIGS. 20 and 21 are diagrams illustrating examples in which the input apparatus indicates its operation state.
Figure 21:
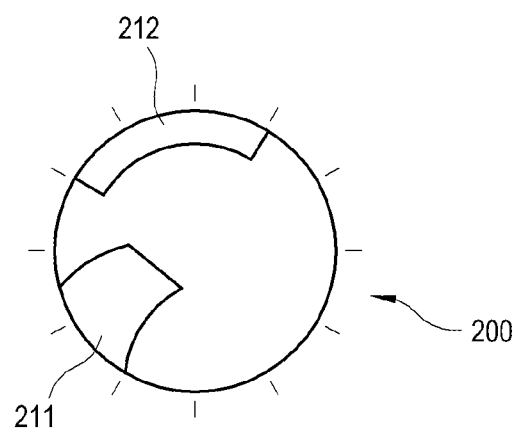

FIGS. 20 and 21 illustrate examples in which the input apparatus 200 indicates its operation state.

As illustrated in FIG. 20 and FIG. 21, the input apparatus 200 may include an output unit for indicating its operation state.

For example, as illustrated in FIG. 20, an indicator 290 such as a light emitting diode (LED) may be provided on the surface, e.g., the outer circumference of the input apparatus 200, and may indicate the operation state of the input apparatus 200. The second controller 260 may be configured to control the indicator 290 to have color or brightness, or a number of flickering times based on certain operations, thereby indicating various operation states.

Further, the indicator 290 may be provided inside the input apparatus 200 and emit light from the whole of the input apparatus 200 as illustrated in FIG. 21. Even in the example illustrated in FIG. 21, the color, brightness, flickering times, etc. of the indicator 290 maybe adjusted to output various operation states. In the example where light is emitted from the whole of the input apparatus 200 as illustrated in FIG. 21, the input apparatus may for example be used as an interior decoration for a mood lamp, a stand lamp, etc.

Although it is not illustrated, the output unit may further include a vibrator, a sound output unit for making a beep, etc. in order to inform a user of the operation state of the input apparatus 200 through various ways such as vibration, beep sound, etc.

The output unit indicates the operation state when a control signal is received from the display apparatus 100, when an error occurs, and so on. Further, the output unit may be configured to periodically make light, sound, vibration, etc. for alerting the location of the input apparatus 200.

Interaction between the display apparatus 100 and a user using the input apparatus 200 will be described in greater detail below.

Figure 25:
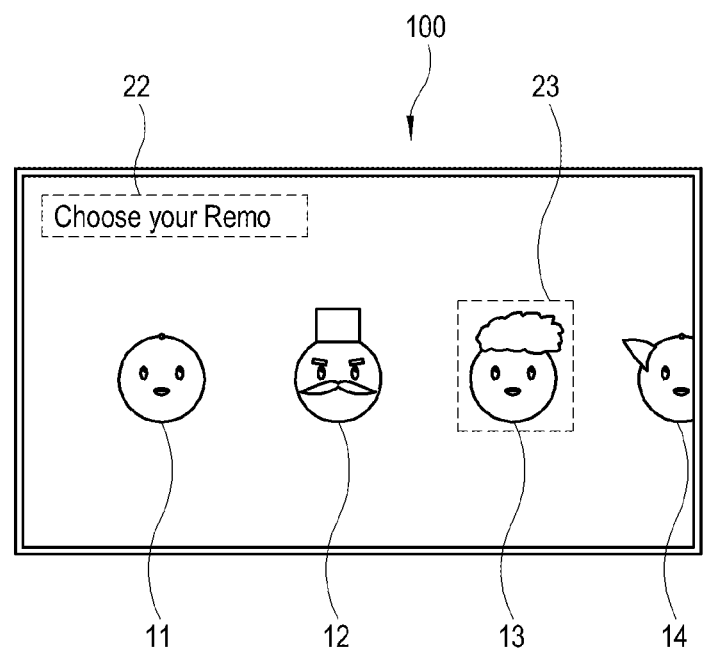
Figure 26:
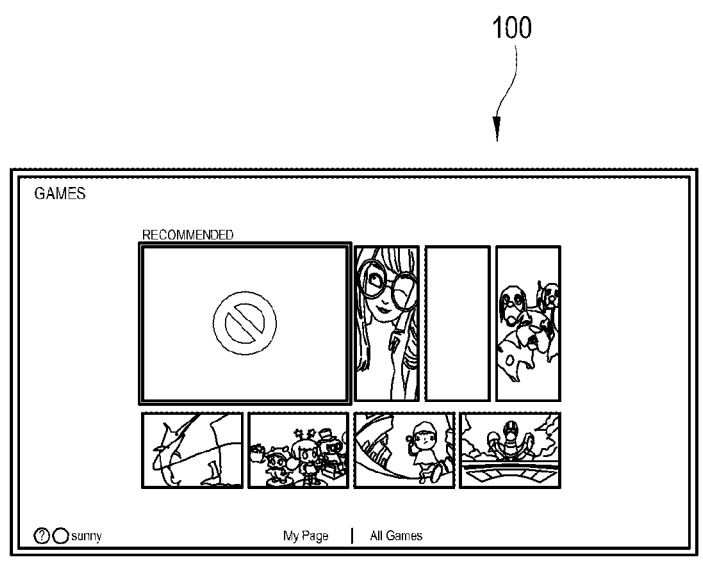
FIG. 26 is a diagram illustrating an example image displayed on a display of a conventional display apparatus.

FIGS. 22 to 25 and FIGS. 27 to 37 are diagrams illustrating example images displayed on a display 130 of a display apparatus 100; and FIG. 26 illustrates an example image displayed on a display of a conventional display apparatus.

Referring to FIGS. 22 to 25 and FIGS. 27 to 36, a virtual character icon may be displayed on a screen as a user interface using the input apparatus 200. The displayed character icon may receive a kind of identity from the display apparatus 100 and be variously utilized in contents provided by the display apparatus 100. For example, in this example, the display apparatus 100 may provide a service customized for a user through a character icon 11.

Figure 22:
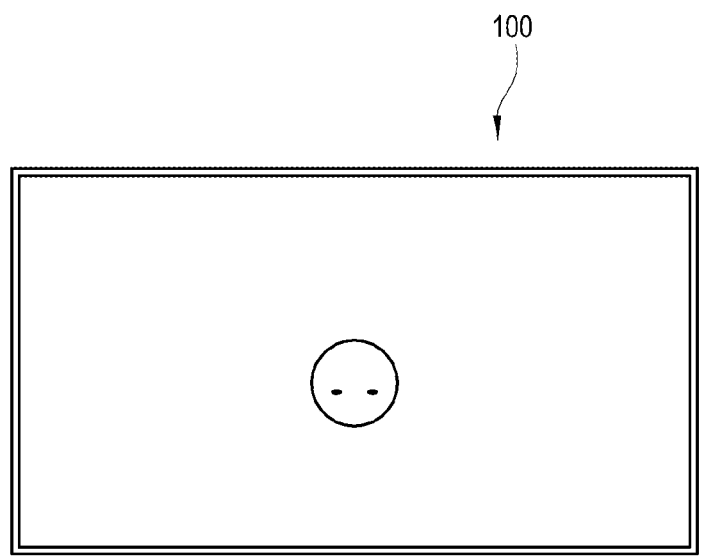

For example, the first controller 160 may be configured to sequentially display the character icons 11 of FIGS. 22 to 24 in response to turning on the display 130. The turning on the display apparatus 100 may include supplying power to the display apparatus in response to the foregoing preset event for moving the input apparatus 200.

For example, the screens may be configured to make the character icons 11 introduce itself through greeting and a message 21 in order of FIG. 22, FIG. 23 and FIG. 24 so that a user can feel a sense of friendliness or familiarity.

In this example, it is possible to give a name to the character icon 11. FIG. 24 illustrates that the character icon 11 is named Remo by way of an example. For example, the name of Remo may be given in the default, but may be changeable by a user. For instance, the character icon 11 may be named Remo 1, Remo 2, or Mother, Father, etc. corresponding to family members, or another different name.

In this example, a plurality of character icons 11 may be selectively provided. For example, as illustrated in FIG. 25, the display 130 may display a plurality of character icons 11, 12, 13 and 14 selectable corresponding to the family members, and a message 22 of allowing a user who views the TV to select the character icon.

A user may remotely select one character icon 13 by moving a cursor 23 through the input apparatus 200. For example, a desired character icon 13 is selected by moving the cursor 23 to the icon 13 among the plurality of character icons 11, 12, 13 and 14 through the dragging using the first area 211 of the touch sensor 210 of FIG. 5 and then clicking the first area 211. The character icon 13 corresponding to a certain user may be selected through the arrow keys 221 and 223, the trackball 222, and other user inputs shown in FIG. 9 and FIG. 13.

According to an example embodiment, the first controller 160 of the display apparatus 100 may be configured to control the display 130 to display the character icon 11 as a predetermined user interface in response to a user's input to the input apparatus 200. For example, a user's input to the input apparatus 200 may include his/her various inputs for viewing the display apparatus 100, i.e. the TV, for example, turning on the TV, channel change, volume control, a command for selecting a menu, etc.

In response to a user's input, the first controller 160 may be configured to identify at least one user who uses the input apparatus 200, and displays the character icon 11 corresponding to the input apparatus 200 and the identified user on the display 130. The character icon 11 may be displayed corresponding to a received user's input. For example, the character icon 11 may be displayed as the initial screens of FIG. 22 to FIG. 24 corresponding to a power-on command, or as a message such as "there will be a change to a channel 10" corresponding to a channel change.

The identification for a user may include identification based on a user' selection using the input apparatus 200 as described in FIG. 25. Further, according to an example embodiment, the identification for a user may be achieved by various methods including identification based on recognition of a user, identification based on an image sensed by an image sensor of a camera, identification using a fingerprint sensor provided in the input apparatus 200, and the like.

Figure 27:
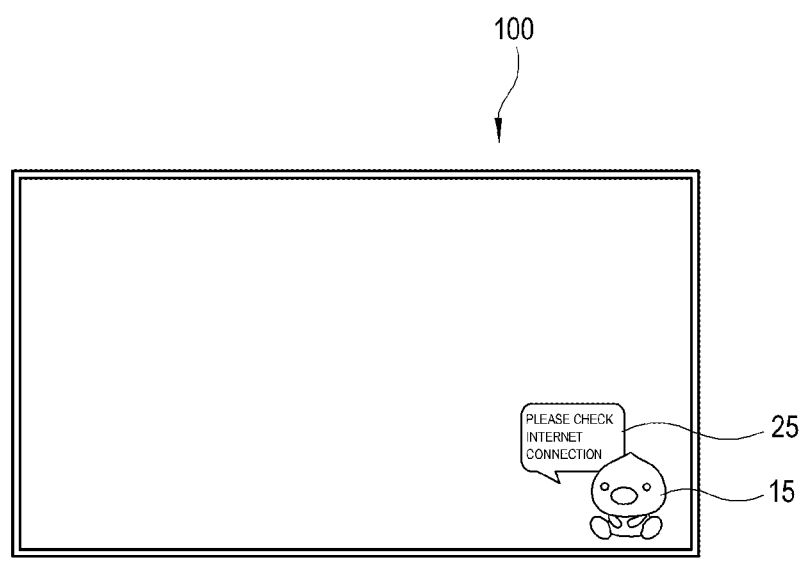

The display apparatus 100 notifies a user of various messages through the character icon. FIG. 26 and FIG. 27 respectively illustrate a conventional screen and a screen according to an example embodiment when an error occurs in the display apparatus 100.

If the display apparatus 100 has an error in network connection, the conventional error screen is as shown in FIG. 26.

On the other hand, according to an example embodiment, the display 130 may display a predetermined message 25 of "please check Internet connection" using the character icon 15.

Likewise, the display 130 may display various messages using the character icon as illustrated in FIG. 28 to FIG. 32.

For example, as illustrated in FIG. 28, if a user's favorite TV show is imminent while the user is watching a soccer game, the display 130 may display information about broadcasting contents through the character icon 16 with a message 26 of "Your favorite TV show begins now."

In response to the displayed message 26, the display apparatus 100 may receive a user's command for changing the channel to a channel corresponding to the TV show from the input apparatus 200. For example, the command for changing the channel may for example be remotely received from the input apparatus 200 by operating a user touch input to the first area 211 of the touch sensor 210 illustrated in FIG. 5, the arrow keys 221 and 223 illustrated in FIG. 9 and FIG. 13, etc. Further, the first controller 160 may be configured to provide a predetermined experience value 31 to the character icon 16 based on a user's selection responding to the displayed message 26, and notify a user of the experience value through the display 130.

In response to the channel change command from the input apparatus 200, the display 130 displays broadcasting contents corresponding to the changed channel as illustrated in FIG. 29.

To provide a user with information about the broadcasting contents as illustrated in FIG. 28, there may be a need of registering a certain content as a favorite broadcast. To this end, as illustrated in FIG. 29, the first controller 160 may be configured to control the display 130 to display a character icon 17 with a message 27 of making a request for registering the corresponding content as the favorite broadcast while a user is viewing predetermined contents through the display apparatus 100.

Thus, a user can register the currently broadcasting contents as the favorite broadcast through the input apparatus 200 in response to the displayed message 27. Further, the first controller 160 may be configured to register the corresponding broadcasting contents as the favorite broadcast based on a user's selection and to store corresponding information in the first storage 150. In accordance with the registration, the first controller 160 may be configured to control the display 130 to display that the experience value 32 is given to the character icon 17.

According to an example embodiment, the display apparatus 100 may display a character icon 18 with a message 28 of various pieces of information while the broadcasting content is displayed. For example, if a vehicle in which a user is interested in appears while the user is viewing a TV show as illustrated in FIG. 30, the display 130 may display a message 28 informing a user of the appearance of the vehicle.

In response to the message 28 illustrated in FIG. 30, the display apparatus 100 may receive a command for searching detailed information about the corresponding vehicle from the input apparatus 200. Further, the first controller 160 may be configured to search necessary information through the first communicator 140, and to notify a user of the detailed information 41 based on the searching results as illustrated in FIG. 31 through the display 130. The first controller 160 may be configured to control the display 130 to display that an experience value 32 is given to the character icon 18 in accordance with information searches.

As described with reference to FIG. 28 to FIG. 31, it is possible to provide a user with various pieces of broadcasting content information as customized services through the character icons 16, 17 and 18, and to provide a predetermined experience vale to the character icon in response to the provided information, thereby increasing a level of the character icon as the experience values are accumulated.

Further, the customized service using the character icon 19 includes a chatting service as illustrated, for example, in FIG. 32.

As illustrated in FIG. 32, a user can chat with other users through the character icon 19 while a certain content is being broadcasted. If a user inputs a text to a chatting box 42, the experience value 33 is given to the character icon 19 and thus the level of the character icon 19 is increased. A user can chat with other viewers through the input apparatus 200 or another input apparatus connectable through the first communicator 140, for example, a wireless keyboard, etc.

According to the foregoing example embodiment, the character icons 15, 16, 17, 18 and 19 may directly communicate with a user, and the messages 25, 26, 27 and 28 and the related information 41 and 42 using the character icons are displayed on the screens of the display apparatus 100, thereby having an effect on providing information and increasing friendliness toward a user.

As described with reference to FIG. 28 to FIG. 32, if the experience values given to the character icon are accumulated higher than a predetermined reference level, the first controller 160 may be configured to increase the level of the character icon.

Accordingly, as illustrated in FIG. 33, the display 130 may display a message 35 that the experience value 34 accumulated with regard to the character icon is leveled up (e.g., increased). Further, if the experience values are continuously accumulated, level-up 36 to the next level is possible as illustrated in FIG. 34.

According to an example embodiment, the character icon is purchasable, and the first controller 160 may be configured to increase the level the character icon in response to the purchase of the character icon. For example, as illustrated in FIG. 35, a purchase price may be determined corresponding to the level of the character icon, and a user may make selection to purchase a certain character icon 51 through the input apparatus 200. Thus, a user may customize the character icon.

According to an example embodiment, a user can participate in various missions through the character icon. For example, the mission may include a game, which is included in the customized service provided through the character icon.

For example, as illustrated in FIG. 36, the level 53 of the character icon may be increased in response to the participation in the game using the character icon 51. For example, the displayed character icon 51 corresponds to the shape of the input apparatus 200, so that direct interaction between the display apparatus 100 and a user who operates the input apparatus 200 can be achieved with friendliness to the user.

If there are a plurality of character icons, the plurality of character icons may provide customized services corresponding to a plurality of users, respectively. Further, the plurality of users individually use the display apparatus and the input apparatus to participate in the mission and receive service through the character icon.

Figure 37:
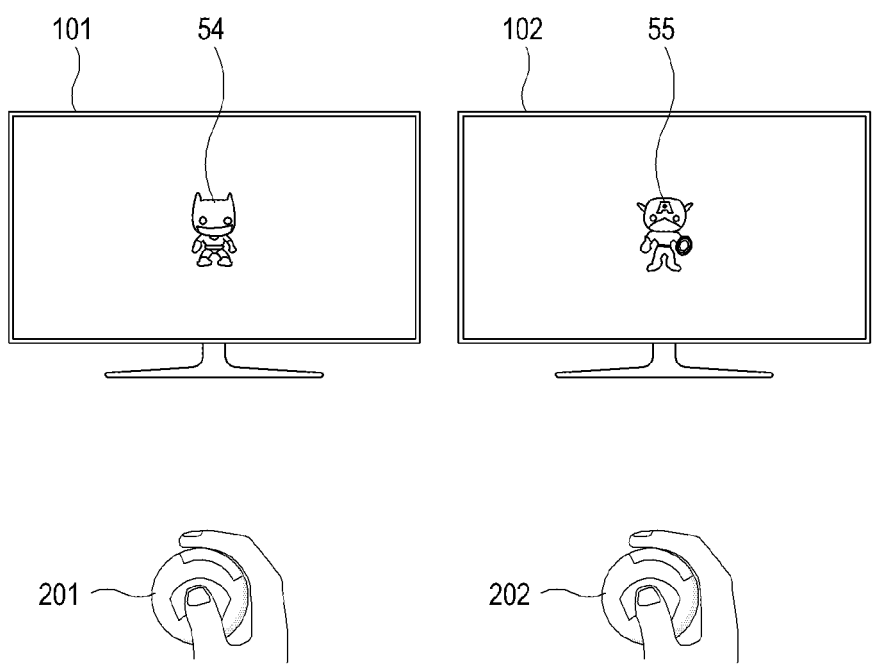

For example, as illustrated in FIG. 37, a user 1 participates in a game with regard to a character icon 54 through a first display apparatus 101 and a first input apparatus 201, and a user 2 participates in a game with regard to a character icon 55 through a second display apparatus 102 and a second input apparatus 202, so that a user 1 and a user 2 can be put into competition with each other. For example, a user may hold a dominant position in a game by participating in various missions and purchasing a character, etc. through the character icon assigned to him/her and thus increasing the experience value.

According to an example embodiment, a user may be more interested in and variously utilize the character icon in such as manner of inducing competition between users.

The foregoing character icon is assigned to a certain user (for example, the character icon 54 assigned to a user 1, and the character icon 55 assigned to a user 2), and thus a user can receive service using the character icon through another terminal apparatus different from the display apparatus 101 and 102.

For example, a user 1 may use a smart phone, a smart pad (tablet) or a personal computer (PC) to participate in various missions using the character icon 54, and the experience value corresponding to the participation may be given to the character icon 54.

Information such as the experience value and the like of the character icon 54 assigned to users is stored in one or more of the display apparatus 101, another terminal apparatus, and still another external apparatus, e.g., a server (including a cloud server), and is thus shared among various apparatuses connectable to a network. As necessary, various methods may be employed for interaction with a user.

FIGS. 38 to 43 are diagrams illustrating example screens displayed on a display 130 of a display apparatus 100.

Figure 38:
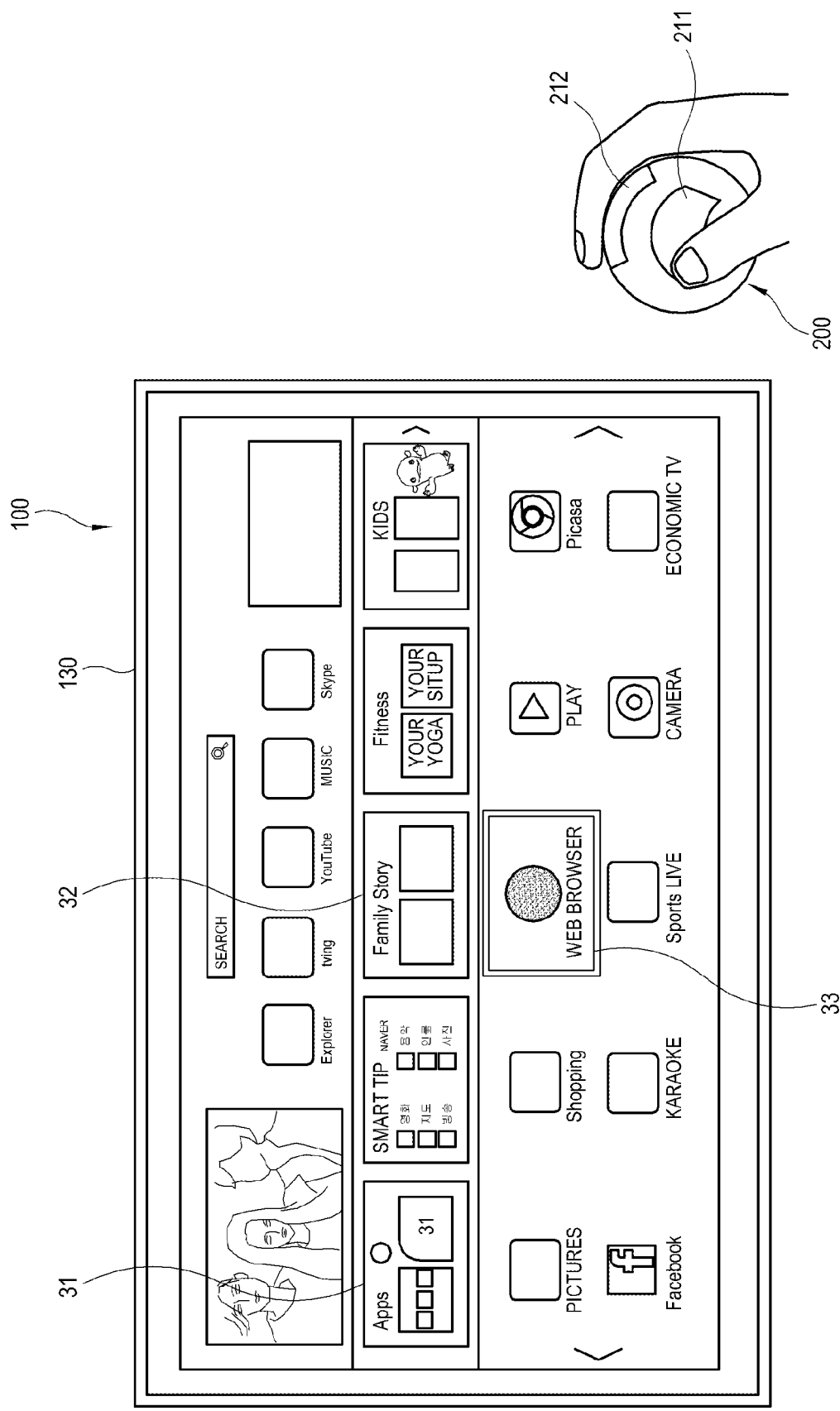

The screen illustrated in FIG. 38 may, for example, be an initial screen (or a home screen) of the display apparatus 100. For example, when the display apparatus 100 according to an example embodiment is powered on, the screen of FIG. 38 may for example be displayed after the images of FIG. 22 to FIG. 24 or be directly displayed when the display apparatus 100 is turned on. Further, the screen of FIG. 38 may be displayed in response to a user's selection of the home screen among the operations of the display apparatus 100.

As illustrated in FIG. 38, the screen of the display 130 may include setting menus 31, 32 and 33 for the display apparatus 100, and the first controller 160 may be configured to control the display 130 to lay emphasis on a position corresponding to a user's selection by a focus, a pointer, a cursor, highlights, flickering, etc. Thus, it is possible to emphasize the currently selected menu 33.

A user may, for example, select one of the displayed setting menus by operating the first area 211 or the second area 212 of the touch sensor 210 in the input apparatus 200, and the first controller 160 may be configured to control the display 130 to change and display the screen corresponding to a command received from the input apparatus 200 through the first communicator 140.

For example, the first controller 160 may be configured to control the pointer emphasizing the selected menu to be moved and displayed leftward or rightward in response to the touch input to the first area 211 in the input apparatus 200, and to control the pointer to be moved and displayed upward or downward in response to the touch input to the second area 212.

For example, if a command for increasing the X coordinate in the first area 211 is received in the state that the pointer is positioned at an application item 31, the pointer may move to a family story item 32 in response to the increase. Likewise, if a command of decreasing the Y coordinate in the second area 212, of which coordinates are set as illustrated in FIG. 7, is received in the state that the pointer is positioned at the family story item 32, the pointer may move to a web browser item 33 in response to the decrease.

The coordinates set to the first area 211 and the second area 212 are not limited to the foregoing description, and may be variously set to perform the corresponding operations in the display apparatus 100 in response to a user's touch input.

Likewise, the input apparatus 200 provided with the arrow keys 221, 223 as illustrated in FIG. 9 or FIG. 13 also makes a cursor move in response to a user's input to the arrow keys.

In the state that the pointer is displayed on the web browser item 33 as illustrated in FIG. 38, a user may select the web browser item 33 by clicking the touch sensor 210, the trackball 222 or the like of the input apparatus 200. For example, the second controller 260 of the input apparatus 200 may be configured to generate a selection command regardless of whether a clicked position on the touch sensor 210 is the first area 211 or the second area 212 and transmit the selection command to the display apparatus 100.

Figure 39:
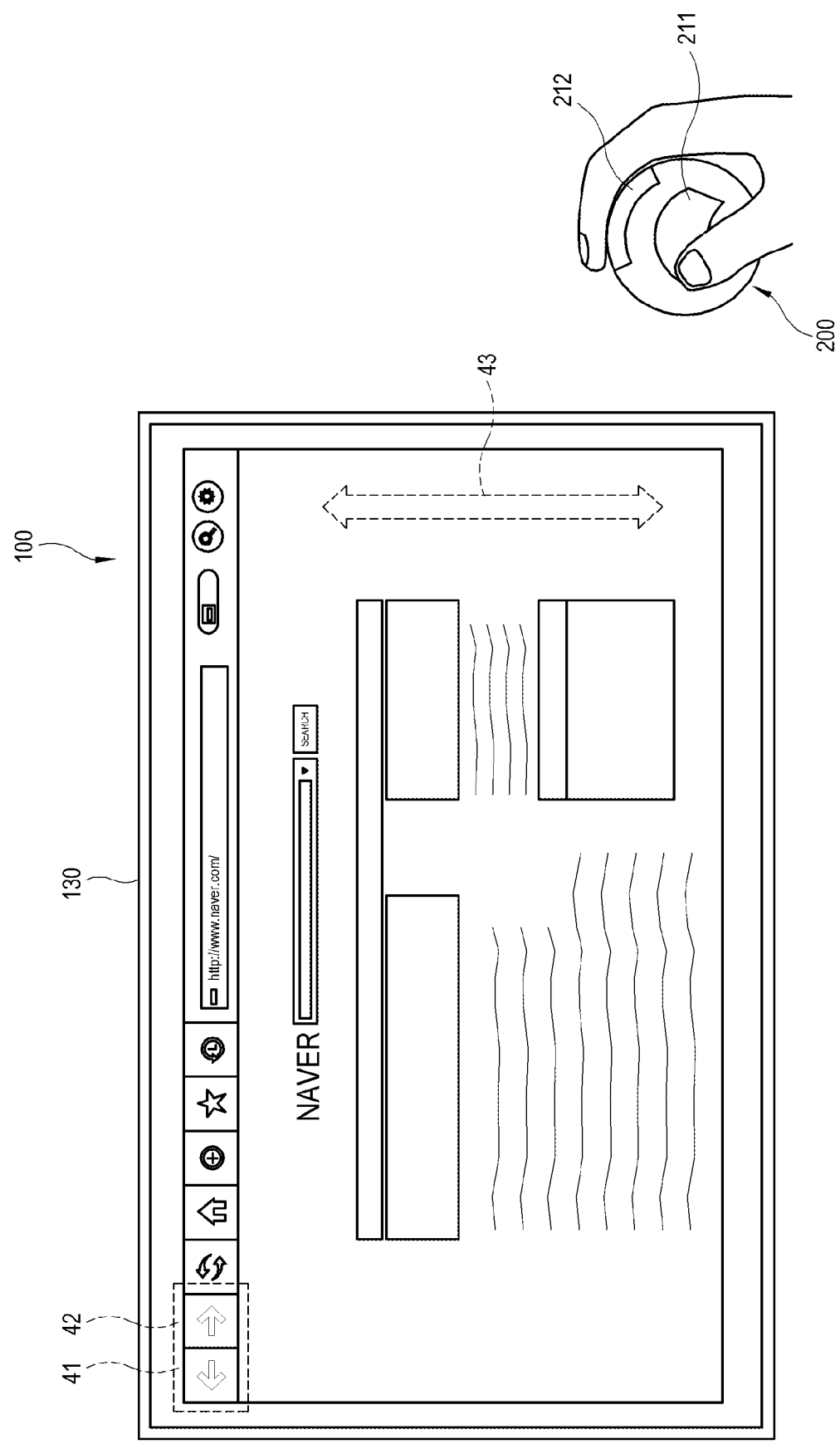

When receiving the command for selecting the web browser item 33, the first controller 160 may be configured to control the display 130 to display a web browser as illustrated in FIG. 39. The web browser includes an application installed in the display apparatus 100 and performs a web browsing function.

The first controller 160 may be configured to move a web page to the next page if receiving a command for increasing the X coordinate as a touch input to the first area 211 in the state that the web browser is displayed on the display 130 as illustrated in FIG. 39, and to move the web page to the previous page if receiving a command for decreasing the X coordinate. For example, the X-coordinate increasing command may correspond to selection of a next-page moving item 42 on the web browser, and the X-coordinate decreasing command may correspond to selection of a previous-page moving item 41.

The first controller 160 may be configured to scroll the web page up if receiving a command for increasing the Y coordinate as a touch input to the second area 212, of which coordinates are set as illustrated in FIG. 7, and scrolls the web page down if receiving a command for decreasing the Y coordinate. For example, the Y-coordinate increasing and decreasing commands respectively correspond to a user's scrolling the web page up and down.

A user selects a menu item by dragging the first area 211 of the touch sensor 210 with a thumb or intuitively dragging the second area 212 with an index finger while holding the input apparatus 200 in one hand, thereby moving and displaying the web page.

According to an example embodiment, items 51, 52, 53, 54 and 55 of the setting menu and their sub items 61, 62, 63,

64, 65, 66, 67 and 68 are more quickly and conveniently selectable by a touch input to the set areas as described with reference to FIG. 40 to FIG. 43.

For example, the first controller 160 may be configured to control the display 130 to sequentially display the display screens of FIGS. 40 to 43 by remotely receiving the X-coordinate decreasing command as, for example, a strong touch input having pressure, speed and/or distance greater than a preset reference value to the first area 211 from the input apparatus 200. Thus, a user can instantly get feedback from the touch input to the first area 211 of the touch sensor 210. The display 130 emphasizes an item 51 (see FIG. 40) currently selected among the items 51, 52, 53, 54, 55 of the setting menu and an item 61 (see FIG. 40) selected among their sub items with the pointer.

Figure 40:
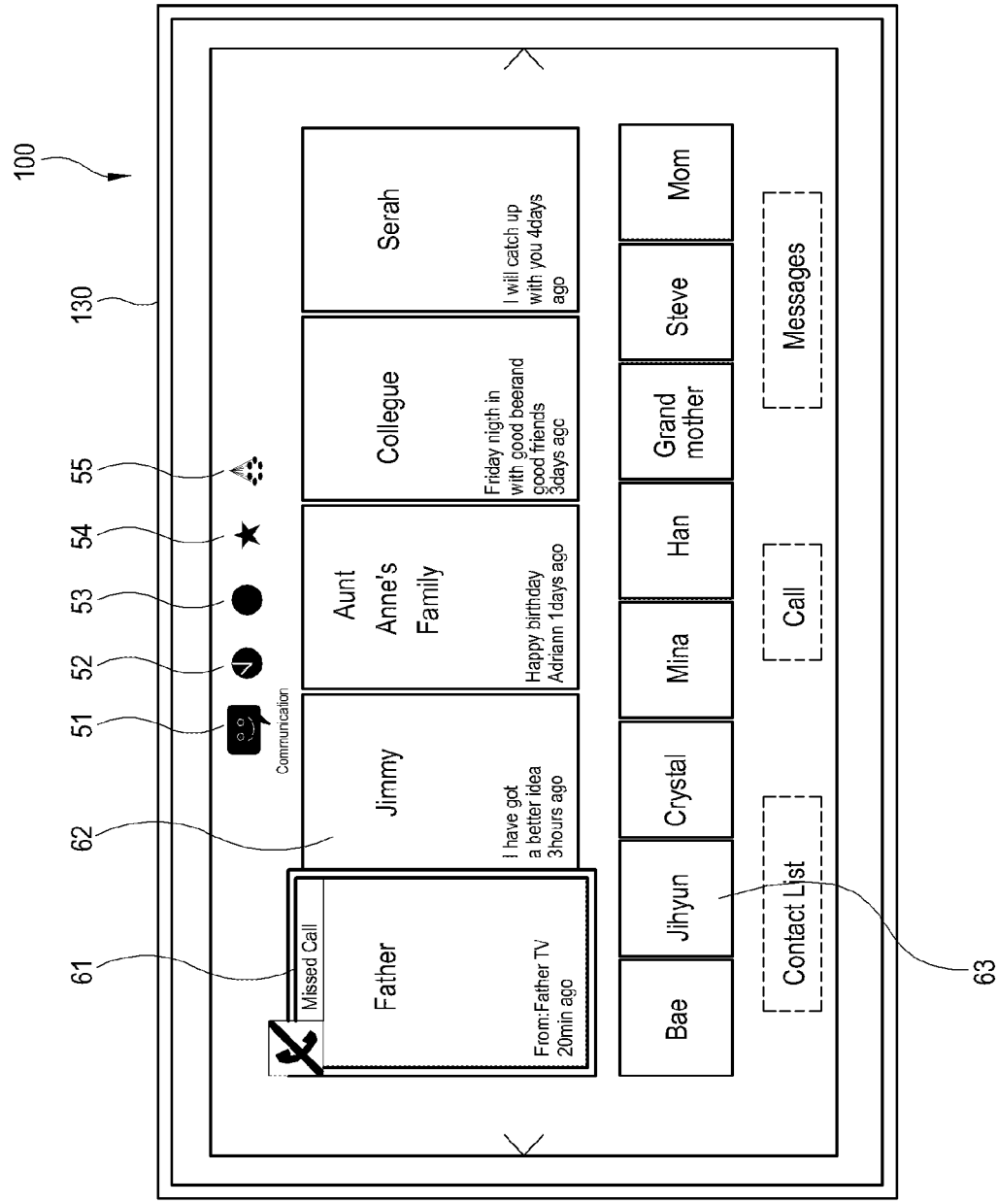

In the state that the communication item 51 is selected as illustrated in FIG. 40, a user may select the sub item 61, 62 or 63 by operating the first area 211 or the second area 212 of the touch sensor 210. For example, the received touch input may be a relatively weak touch input having pressure, speed and/or distance less than the preset reference value.

Figure 42:
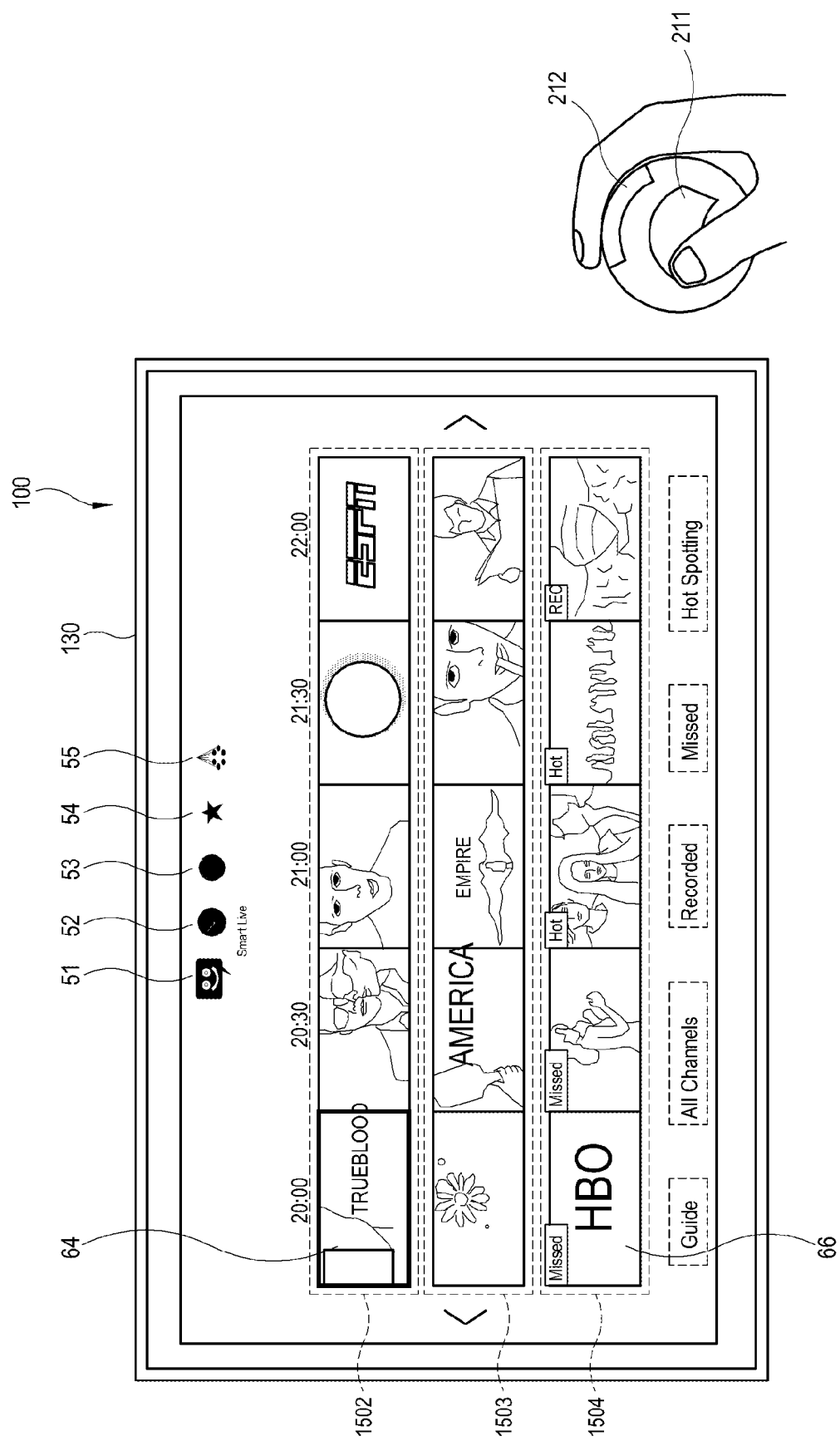

For example, according to an example embodiment, the items 51, 52, 53, 54 and 55 of the setting menu are moved to change and display the screens of FIGS. 41 to 43 with regard to the strong touch input to the first area 211 in the state that the screen of FIG. 40 is displayed, and to change and display the selected sub items 61 and 62 with regard to the relatively weak touch input to the first area 211. In this manner, the input apparatus 200 may be used for intuitive interaction with respect to the screen displayed on the display 130.

Further, according to an example embodiment, items 51, 52, 53, 54 and 55 the setting menu are moved or the selected sub item 61, 62 is changed and displayed in accordance with the current position of the cursor on the screen of FIG. 40.

If a user strongly operates the first area 211 of the touch sensor 210 (for example, leftward dragging over a predetermined reference distance) in FIG. 40, a selected item is moved to a smart live item 52 and displayed, and sub items 64, 65 and 66 of the smart live item 52 are displayed together as illustrated in FIG. 41 and FIG. 42.

Likewise, if a user strongly operates the first area 211 of the touch sensor 210 (for example, leftward dragging higher than a predetermined reference speed) in FIG. 42, a selected item is moved to a preference content item 54 and displayed, and sub items 67 and 68 of the preference content 54 are displayed together as illustrated in FIG. 43. At least one among the sub items 67 and 68 of this preference content 54 may correspond to the broadcasting content registered as the favorite broadcast in FIG. 29.

A user may freely select the sub items 64, 65, 66, 67 and 68 by weakly operating the first area 211 or the second area 212 of the touch sensor 210 even in FIG. 42 and FIG. 43 (for example, dragging smaller than a predetermined reference speed or distance).

In the foregoing example, the menu item is moved/selected or the web browser is moved/changed in response to the touch input to the first and second areas 211 and 212 of the touch sensor 210. However, there is no limit to a command based on operation of the setting area.

For example, according to another example embodiment, an on screen display (OSD) may be displayed sliding from a top edge of the display 130 in response to the Y-coordinate decreasing command to the first area 211 in the state that the broadcasting contents and the like image are being displayed, or the OSD may be displayed sliding from a bottom edge of the display 130 in response to the Y-coordinate increasing command. Likewise, the OSD may be displayed sliding from a left edge of the display 130 in response to the X coordinate increasing command to the second area 212, and the OSD may be displayed sliding from a right edge of the display 130 in response to the X coordinate decreasing command.

Even with regard to a user's input by a single or combination of the plurality of arrow keys 221 and 223 and the trackball 222 in the input apparatus 200 illustrated in FIG. 9 and FIG. 13, the display 130 can intuitively reflect and display the corresponding input in various ways.

A control method of the display system 1 including the input apparatus 200 and the display apparatus 100 according to an example embodiment will be described below with reference to FIG. 44.

Figure 44:
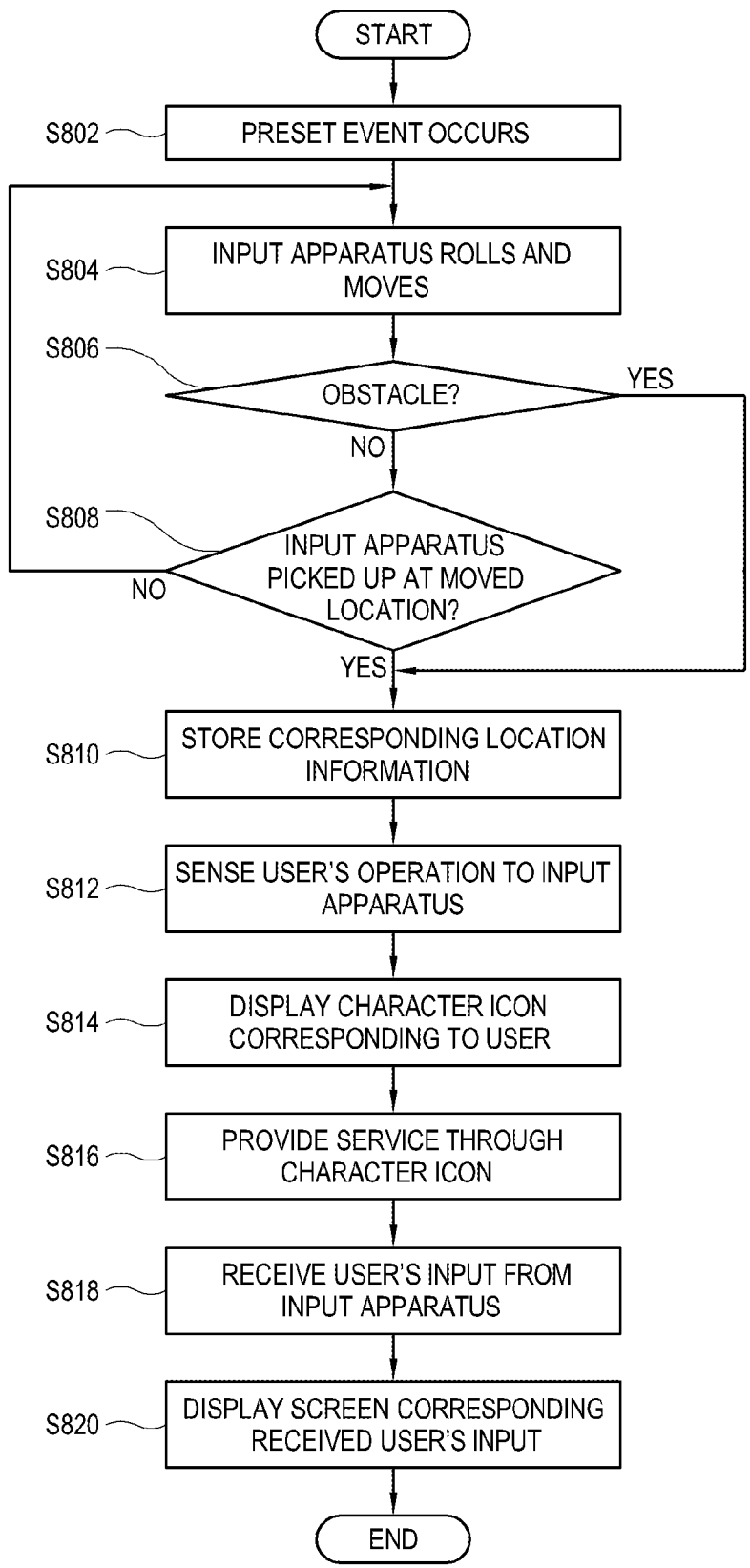
FIG. 44 is a flowchart illustrating an example control method of a display system.

FIG. 44 is a flowchart illustrating an example control method of the display system 1.

As illustrated in FIG. 44, the display system 1 may sense occurrence of a preset event (S802). The preset event may include at least one of a user's operation to the user input provided in the display apparatus 100, a user's input using a terminal apparatus (e.g. a smart phone) different from the display apparatus 100 and the input apparatus 200, a user's voice, a user's motion and a user who standing in front of the display apparatus 100.

In response to the event sensed in the operation S802, the second controller 260 of the input apparatus 200 may be configured to move the input apparatus 200 to the preset location corresponding to a user's location so that the user can take and use the input apparatus 200 (S804). For example, the second controller 260 may be configured to control the driver 270 provided inside the input apparatus 200 having a movable shape like a spherical shape, so that the input apparatus 200 can roll toward the preset location.

The preset location is an expected location where a user is, and for instance corresponds to a location of a sofa as illustrated in FIG. 6. Further, the preset location may correspond to the latest location where the input apparatus 200 is picked up by a user of where an obstacle is sensed.

According to an example embodiment, as illustrated in FIG. 6, the input apparatus 200 may have two-step movement of moving toward the reference location, i.e. the front of the display apparatus 100 by a first distance, and then moving toward the preset location by the second distance.

The input apparatus 200 may stop moving by sensing an obstacle during the movement in the operation 804 (S806). For example, the obstacle may be a big obstacle that the input apparatus 200 cannot step over, and for example may include a piece of furniture, a user, or the like. In this example, it is determined that the input apparatus 200 is blocked and stopped by a user.

If an obstacle is not sensed during the movement, the input apparatus 200 moves to the preset location. If the moved location is matched with a user's actual position, the input apparatus may be picked up by a user at this location (S808). On the other hand, if the input apparatus 200 does not sense an obstacle and is not picked up by a user, the input apparatus 200 may further move by a predetermined distance.

Further, the location information corresponding to the stopped location in the operation S806 or the picked-up location in the operation S808 is stored (S810). For example, the location information may be stored in the first storage 150 of the display apparatus 100 or the second storage 25 of the input apparatus 200, or may be stored in another apparatus such as a server to which the display apparatus 100 and the input apparatus 200 can have an access as necessary.

Further, if there is previously stored location information, the location information is updated with the current location information.

The stored location information may be used as the preset location applied to the operation S804 when the event occurs in the operation S802 at the next turn. For example, according to an example embodiment, the input apparatus 200 may learn a user's pattern, determine an optimum location by itself and automatically move to the determined location. Accordingly, repetitive use makes the input apparatus 200 roll toward a user by itself, thereby increasing a user's satisfaction.

Since a user can take and use the input apparatus 200 in this manner, the first controller 160 of the display apparatus 100 may be configured to remotely receive a user's operation from the input apparatus 200 (S812).

The first controller 160 may be configured to control the character icon (refer to 11 of FIG. 22 to FIG. 24) as a user interface corresponding to the input apparatus 200 in response to a user's input received at the operation S812 (S814). For example, the first controller 160 may be configured to identify at least one user who uses the input apparatus 200, and to display the character icon (refer to 13 of FIG. 25) corresponding to the identified user.

The display apparatus 100 may provide various services to a user though the character icon in the operation S812 (S816). For example, the provided service may include a service customized to a certain user, and thus the display apparatus 100 may for example provide information about the broadcasting contents illustrated in FIG. 27 to FIG. 32, the chatting service, the game mission shown in FIG. 35, etc. through the character icon.

A user operates the input apparatus 200 to receive a service using the character icon and participate in various missions, and the first controller 160 may be configured to provide the experience value to the character icon in response to the use of the service or the participation in the mission, thereby leveling the character icon up. A user may purchase his/her own character icon or uses the character icon through the terminal apparatus, thereby leveling the character icon up. With this level-up process, a user can be put into competition with another user, and have higher friendliness toward the character icon.

Further, the display apparatus 100 may remotely receive a user's input from the input apparatus 200 (S818). For example, the received user's input may include a user's touch input to the first area 211 or the second area 212 of the touch sensor 210 as illustrated in FIG. 4 to FIG. 6, operation of the arrow keys 221 and 223 and the trackball 222 of FIG. 9 and FIG. 13, a motion input to the motion sensor provided inside the input apparatus 200, etc.

The first controller 160 may be configured to control the display 130 to display a screen corresponding to a user's input received in the operation S818 (S820). For example, the display 130 may display a screen intuitively corresponding a user's input to the input apparatus 200. For example, a channel may be changed in response to the operation of the first area 211 of the touch sensor 210, and a volume may be controlled in response to the operation of the second area 212. Further, as described with reference to FIG. 38 to FIG. 43, a screen directly reflecting the operation sensed in the input apparatus 200 may be displayed.

In addition, the use of the input apparatus 200 according to an example embodiment may be extended for various utilizations.

Figure 45:
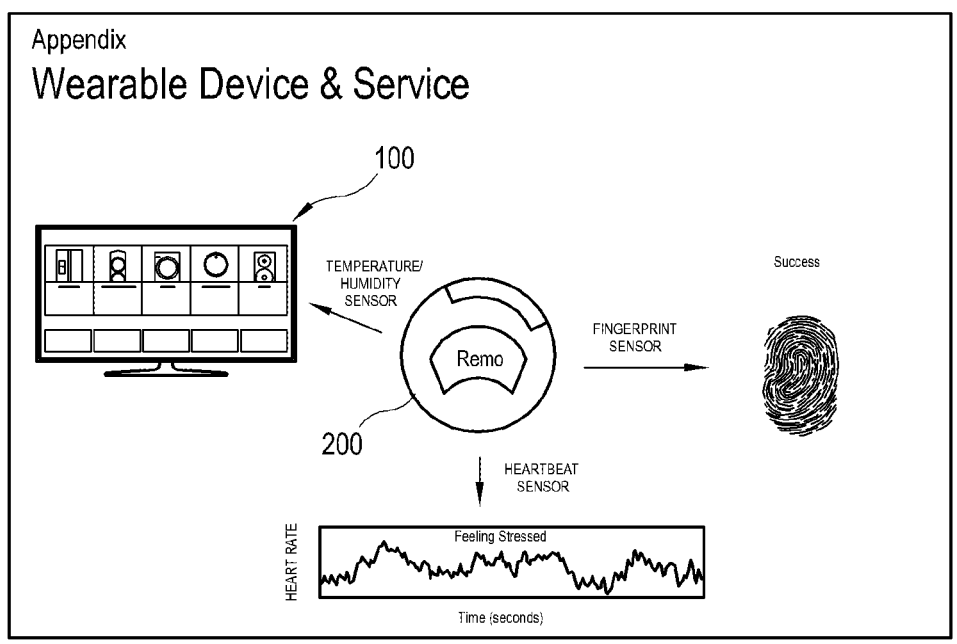
FIGS. 45 and 46 are diagrams illustrating examples of utilizing the input apparatus.
Figure 46:
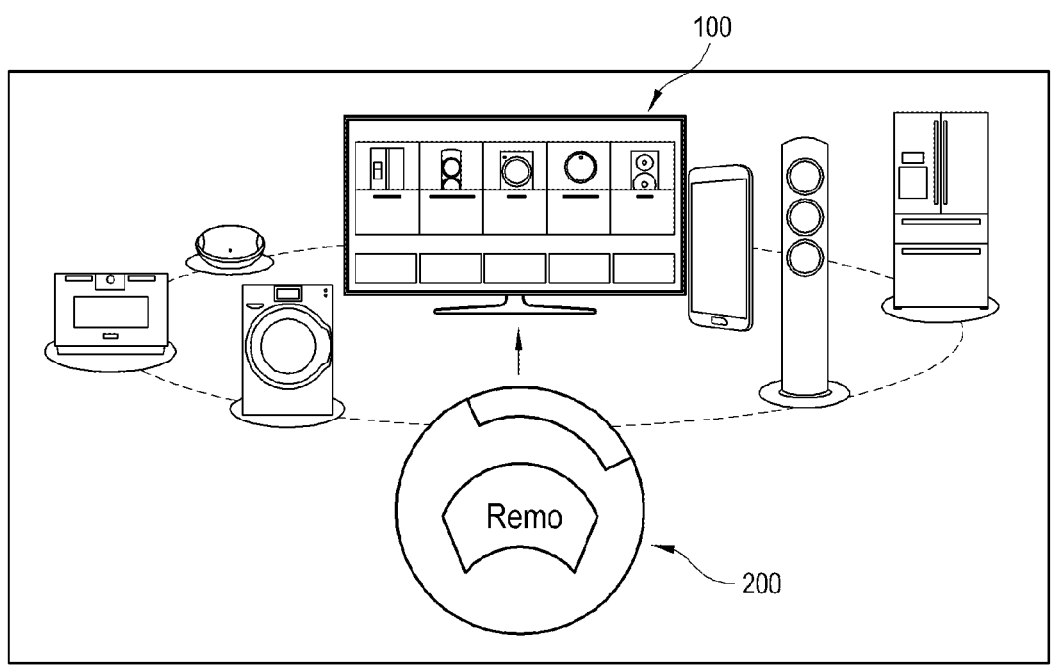

FIGS. 45 and 46 are diagrams illustrating examples of utilizing the input apparatus 200.

As illustrated in FIG. 45, the input apparatus 200 may further include not only a touch sensor 210 for sensing a user's input, but also a sensor including one or more among a fingerprint sensor, a heartbeat sensor, a temperature/humidity sensor, a vibration sensor, a gravity sensor, various gyroscope sensors, a geomagnetic sensor, an acceleration sensor, a direction sensor, etc.

The input apparatus 200 with these sensors may be used variously. For example, the fingerprint sensor may be used to sense a user's fingerprint and utilized for a user authentication, e.g., security for a predetermined function supported by at least one of the input apparatus 200, the display apparatus 100, and another communicative terminal apparatus.

Further, the heartbeat sensor, the vibration sensor, the gyroscope sensor, the acceleration sensor, the temperature/humidity sensor, etc. may be used to check a user's sleeping time and exercise amount, and temperature/humidity, so that the input apparatus 200 may be utilized for smart health care. For example, the vibration sensor may be used to check the exercise amount. In addition, various sensors for sensing a motion, the heartbeat sensor, etc. are used for a sleeping sensor, thereby measuring a user's tossing and turning, breathing period, heart rate, etc. The sensed values may be transmitted to a user's terminal apparatus (e.g. a smart phone) or the display apparatus 100 (e.g. a TV), and thus used for waking him/her up in accordance with physical cycles, making sound for a deep sleep and wake-up, or notifying him/her of necessary exercising amount. Further, the values sensed by the temperature/humidity sensor may be used for controlling an air conditioner through the display apparatus 100.

Further, a user may be notified of the sensed values by various ways a call of a mobile phone communicating with the input apparatus 200, a text message, etc.

The input apparatus 200 may receive the call of the mobile phone, the text message, etc. through data communication with a user's terminal apparatus, e.g., the mobile phone, and notifies a user of them through the input apparatus 200 or the display apparatus 100.

The sensed values of these sensors may be transmitted to the display apparatus 100, and may be used for controlling various home appliances provided in a house, e.g. a refrigerator, an air conditioner, a washing machine, a robot cleaner, an audio dock, etc. For example, the air conditioner may operate when the temperature/humidity sensor senses that a temperature is excessively high, and music for rest of mind and body may be playing through the audio dock when the heartbeat sensor senses that a user's stress index is high.

Further, a user may use the input apparatus 200 as a universal remote controller for controlling various devices as illustrated in FIG. 46. The input apparatus 200 according to this example may sense a user's input through various ways, and control various other apparatuses such as a smart phone, a refrigerator, an air conditioner, a washing machine, a robot cleaner, an audio dock, etc.

The system 1 with the input apparatus 200 may form a smart home and be used and extended in various ways.

For example, as illustrated in FIG. 46, other apparatuses connected to the TV 100 through a communication network, i.e. a refrigerator, an air conditioner, a washing machine, a robot cleaner, etc. may be controlled to be used as a user service or help desk.

For example, the control may be performed in order of the input apparatus 200->the display apparatus 100->the input apparatus 200->other apparatuses. For example, if a user executes a user service application through the input apparatus 200, e.g., the remote controller, selectable apparatus and functional screens for various settings of the selectable apparatuses may be displayed on the display apparatus 100, e.g., the TV as illustrated in FIG. 46. A user selects an apparatus to be controlled (e.g. a refrigerator) and inputs a command (e.g., for setting refrigerating and cooling temperatures) through the remote controller, and the command is transmitted to the apparatus to be controlled (e.g. a refrigerator) directly from the input apparatus 200 or through the display apparatus 100.

The function screen of the display apparatus 100 may give a user feedback on operations of respective apparatuses, and may be displayed through another terminal apparatus pairing with at least one of the display apparatus 100 and the input apparatus 200, i.e., through the mobile phone so as to receive a user's input.

According to an example embodiment, the movable input apparatus 200 comes to a user by itself, and thus there is no need of directly looking for the input apparatus. Further, a user can have friendliness or familiarity toward the rolling input apparatus through new experiences, thereby improving convenience. Further, the optimum location is continuously updated by iterative learning, so that a user can use the input apparatus 200 customized to himself/herself, thereby increasing his/her satisfaction.

Further, the first and second areas 211 and 212 of the touch sensor 210 in the input apparatus 200 may be ergonomically designed to be suitable for a user's hand, and respectively matched with the channel change and the volume control, thereby achieving more user-friendly and close interaction with a user.

Further, the screen of the display apparatus 100 intuitively reflects a user's input using the input apparatus 200, so that the user can easily and conveniently use the input apparatus 200 without reading a manual.

Further, the display apparatus 100 provides various customized services through the character icon corresponding to the input apparatus 200, and therefore friendliness toward a user is increased and the user is induced to accumulate experiences through communion between him/her and the input apparatus 200, thereby having effects on utilizing the character icon in various ways.

Although several example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A remote input apparatus for a display apparatus, comprising:
   at least one touch sensor of the remote input apparatus configured to sense a touch input received from a user;
   communication circuitry configured to communicate with the display apparatus; and
   at least one processor configured to move the remote input apparatus to a preset location by rolling the remote input apparatus having a substantially spherical shape toward the preset location in response to a preset event, wherein the touch sensor comprises:
   a first area configured to receive the touch input along a first touch path of the substantially spherical remote input apparatus with a first finger; and
   a second area configured to receive the touch input along a second touch path of the substantially spherical remote input apparatus with a second finger.

2. The input apparatus according to claim 1, further comprising a driver configured to apply a driving force to move the input apparatus, and
   wherein the input apparatus is driven by the driver to roll toward the preset location.

3. The input apparatus according to claim 1, wherein the preset event comprises one or more of a user's operation to a user input device provided in the display apparatus, a user's input using another terminal apparatus paired with at least one of the display apparatus and the input apparatus, a user's voice, a user's motion and a user positioned in front of the display apparatus.

4. The input apparatus according to claim 1, wherein the preset location comprises a first location distant from a front of the display apparatus by a first distance, and a second location distant from the first location by a second distance.

5. The input apparatus according to claim 2, wherein the at least one processor is configured to control the driver to move the input apparatus from the preset location to a third location by a third distance if the input apparatus is not picked up by the user or does not sense an obstacle in the preset location.

6. The input apparatus according to claim 5, further comprising a storage configured to store a value corresponding to the preset location, wherein
   the at least one processor is configured to update the stored value with a value corresponding to a location where the input apparatus is picked up by a user or senses an obstacle.

7. The input apparatus according to claim 1, wherein
   the first area is configured to sense a pressure or motion due to touch with the first finger; and
   the second area is configured to sense a pressure or motion due to touch with the second finger, and
   the first area and the second area are respectively positioned corresponding to the first finger and the second finger when the substantially spherical input apparatus is held in one hand.

8. The input apparatus according to claim 7, wherein the at least one processor is configured to control the communication circuitry to transmit a command corresponding to one of channel change and volume control to the display apparatus in response to a swiping operation to the first area, and to transmit a command corresponding to the other one of the channel change and the volume control to the display apparatus in response to a swiping operation to the second area.

9. The input apparatus according to claim 1, further comprising an output unit comprising output circuitry, the output unit configured to operate corresponding to operations of the input apparatus, wherein
   the output unit comprises one or more of a vibrator, a light emitting diode, and a sound output unit.

10. A method of controlling a remote input apparatus for communicating with a display apparatus, the method comprising:
   receiving a preset event;
   moving the input apparatus to a preset location by rolling the input apparatus which has a substantially spherical shape toward the preset location in response to receiving the preset event, and
   wherein the input apparatus comprises at least one touch sensor comprising a first area configured to receive the touch input along a first touch path of the substantially spherical input apparatus with a first finger and a second area configured to receive the touch input along a second touch path of the substantially spherical input apparatus with a second finger.

11. The method according to claim 10, wherein the input apparatus comprises a driver configured to apply a driving force to move the input apparatus, and the moving the input apparatus to the preset location comprises driving the input apparatus by applying the driving force of the driver to the input apparatus to cause the input to roll toward the preset location.

12. The method according to claim 10, wherein the preset event comprises one or more of a user's operation to a user input device provided in the display apparatus, a user's input using another terminal apparatus paired with at least one of the display apparatus and the input apparatus, a user's voice, a user's motion and a user positioned in front of the display apparatus.

13. The method according to claim 10, wherein the preset location comprises a first location distant from a front of the display apparatus by a first distance, and a second location distant from the first location by a second distance.

14. The method according to claim 10, further comprising moving the input apparatus from the preset location to a third location by a third distance if the input apparatus is not picked up by the user or does not sense an obstacle in the preset location.

15. The method according to claim 10, further comprising:

storing a value corresponding to the preset location; and updating the stored value with a value corresponding to a location where the input apparatus is picked up by a user or senses an obstacle.

16. The method according to claim 10, wherein the first area is configured to sense a pressure or motion due to touch with the first finger and the second area is configured to sense a pressure or motion due to touch with the second finger, and the first area and the second area are respectively positioned corresponding to the first finger and the second finger when the input apparatus is held in one hand, the input apparatus being substantially spherical.

17. The method according to claim 16, further comprising:

transmitting a command corresponding to one of channel change and volume control to the display apparatus in response to a swiping operation to the first area; and transmitting a command corresponding to the other one of the channel change and the volume control to the display apparatus in response to a swiping operation to the second area.

* * * * *